(12) United States Patent
Raymond

(10) Patent No.: US 7,242,525 B2
(45) Date of Patent: Jul. 10, 2007

(54) CLEAR WALLED CONTAINERS WITH LENTICULAR INSERTS

(75) Inventor: Mark A. Raymond, Littleton, CO (US)

(73) Assignee: Genie Lens Technologies, LLC, Golden, CO (US)

( * ) Notice: Subject to any disclaimer, the term of this patent is extended or adjusted under 35 U.S.C. 154(b) by 0 days.

(21) Appl. No.: 11/386,326

(22) Filed: Mar. 22, 2006

(65) Prior Publication Data
US 2006/0176567 A1 Aug. 10, 2006

Related U.S. Application Data

(60) Division of application No. 11/257,191, filed on Oct. 24, 2005, now Pat. No. 7,057,832, which is a division of application No. 11/182,290, filed on Jul. 15, 2005, now Pat. No. 7,038,854, which is a division of application No. 10/925,179, filed on Aug. 23, 2004, now Pat. No. 6,943,953, which is a continuation-in-part of application No. 10/230,751, filed on Aug. 29, 2002, now Pat. No. 6,781,761.

(51) Int. Cl.
G02B 27/10 (2006.01)
G03B 21/60 (2006.01)

(52) U.S. Cl. .................. 359/619; 359/455; 359/623

(58) Field of Classification Search ............... 359/618, 359/619, 622, 623, 454–456, 742, 743, 599, 359/804, 440, 900; 206/168, 139; 283/81; 428/30, 34.7
See application file for complete search history.

(56) References Cited

U.S. PATENT DOCUMENTS 5,525,383 A 6/1996 Witkowski
5,642,226 A 6/1997 Rosenthal
5,695,346 A 12/1997 Sekiguchi et al.
5,753,344 A 5/1998 Jacobsen
5,908,590 A 6/1999 Yoshimi et al.
5,941,382 A 8/1999 Fantone et al.
5,953,170 A 9/1999 Glancy
5,967,032 A 10/1999 Bravenec et al.
6,490,093 B2 * 12/2002 Guest ......................... 359/619
6,581,972 B2 6/2003 Nojima et al.

FOREIGN PATENT DOCUMENTS

CA 2340868 1/2002
JP 11-049175 2/1999

* cited by examiner

Primary Examiner—Ricky Mack
Assistant Examiner—Jack Dinh
(74) Attorney, Agent, or Firm—Kent A. Lembke; Marsh Fischmann & Breyfogle LLP

(57) ABSTRACT

A container for producing a graphical image within the container. The container includes a container wall with a front portion and a rear portion. A label is included that extends about the circumference of the container with an inner surface contacting an exterior surface of the rear portion of the container wall and contacting an exterior surface of the front portion of the container wall. The label includes a lenticular lens array integral with the label to include a plurality of lenses formed, such as through embossing, on the outer surface of the label. The lenses have a focal point on or about the rear portion of the container wall with the lenticular lens array positioned near the front portion of the container wall. A printed image is provided and positioned proximal to the focal point on the inner surface of the label.

4 Claims, 20 Drawing Sheets

CLEAR WALLED CONTAINERS WITH LENTICULAR INSERTS

CROSS-REFERENCE TO RELATED APPLICATIONS

This application is a divisional application of U.S. patent application Ser. No. 11/257,191, filed Oct. 24, 2005, now U.S. Pat. No. 7,057,832, which is a divisional application of U.S. patent application Ser. No. 11/182,290, filed Jul. 15, 2005, now U.S. Pat. No. 7,038,854, which is a divisional application of U.S. patent application Ser. No. 10/925,179, filed Aug. 23, 2004, now U.S. Pat. No. 6,943,953, which is a continuation-in-part of U.S. patent application Ser. No. 10/230,751, filed Aug. 29, 2002, now U.S. Pat. No. 6,781,761. Each of these applications and patents are incorporated herein by reference in their entirety.

BACKGROUND OF THE INVENTION

1. Field of the Invention

The present invention relates, in general, to optical systems using lenticular lens materials or sheets to produce images, and, more particularly, to a lenticular lens system and method for producing images, such as 3-dimensional, colored images, inside or outside of containers with clear or translucent walls.

2. Relevant Background

Clear containers fabricated from plastic and glass are used extensively in packaging of goods ranging from bottled water, alcoholic beverages, and soda pop and other beverages to soap and other household products. Billions of such containers are produced each year typically using blow mold or injection molding technologies. The packaging industry continually struggles to meet two important and, often competing, goals: producing attention-getting, attractive containers to enhance marketing of the product inside the container and controlling material and production costs of the container.

In the competitive packaging and retailing industries (and especially, the beverage industry), marketing professionals and designers struggle to develop the individuality of their product, and most product differentiation is accomplished with the container and its packaging. For example, there is generally little difference between the products of one bottled water company and another and often little difference between one soda pop and another or between one alcoholic beverage and another. The differences are often ones of perception of the products in the minds of the consumer, and this difference in perception is created by advertising and marketing and, in large part, through creative packaging that leads to product identification by package recognition. Studies have shown that a large percentage of purchasing decisions are made at the point of sale when a consumer is faced with numerous products arranged side-by-side and that many of the final purchasing decisions are based at least in part on the attractiveness or distinctiveness of the packaged product or container combined with brand awareness. Hence, a great deal of time, effort, and money is spent on graphics, design, and presentation of the product container such that the product in its container stands out from other similar products on a shelf. For many products, the cost of packaging exceeds the cost of the actual product sold in the container or packaging.

Eye catching graphics in packaging can play a large part at the retail level in making a product appealing to consumers. In the packaging industry, there are a variety of techniques that can provide informational graphics as well as illustrative or "eye appeal" graphics that include one color or use more elaborate multi-color graphics or photographs. More elaborate graphics are often produced with lenticular graphic labels using 3-dimensional (3D) and animation. Lenticular lens material is used in the packaging industry for creating promotional material with appealing graphics and typically involves producing a sheet of lenticular lens material and adhesively attaching the lenticular lens material to a separately produced object for display. The production of lenticular lenses is well known and described in detail in a number of U.S. patents, including U.S. Pat. No. 5,967,032 to Bravenec et al. In general, the production process includes selecting segments from visual images to create a desired visual effect and interlacing the segments (i.e., planning the layout of the numerous images). Lenticular lenses or lens sheets are then mapped to the interlaced or planned segments, and the lenticular lenses are fabricated according to this mapping. The lenticular lenses generally include a transparent web that has a flat side or layer and a side with optical ridges and grooves formed by lenticules (i.e., lenses) arranged side-by-side with the lenticules or optical ridges extending parallel to each other the length of the transparent web. To provide the unique visual effects, ink (e.g., four color ink) is applied to or printed directly on the flat side of the transparent web to form a thin ink layer, which is then viewable through the transparent web of optical ridges.

While these lenticular lens materials provide excellent visual effects, the use of adhesives and other attachment methods has not proven effective in producing high quality, long-lasting, and inexpensive plastic products. Because attaching the lenticular lens material after producing the container is inefficient and relatively expensive, the plastic manufacturing industry is continually searching for methods for attaching the lenticular lens material to plastic cups or containers as part of the cup or container manufacturing process. To date, the plastic manufacturing industry has only had limited success in overcoming the problems associated with using common lenticular lens material as part of standard plastic fabrication processes. The problems arise because plastic fabrication generally includes processes such as injection molding that involve heating raw plastic materials to a relatively high temperature (e.g., 400 to 500° F. or hotter) and then injecting the fluid plastic into a mold with the shape of the desired plastic object or by otherwise processing the molten plastic. The ink or ink layer has a chemistry that does not stay intact when the ink is heated to these high temperatures, and the image is destroyed or at least significantly altered.

Further, the use of these graphic techniques is often rejected by the retail industry due to its high cost per container. The lenticular lens labels are typically costly and are difficult to justify based on a cost-benefit analysis, e.g., the additional customer attention and increased sales are typically not offset by the reduced profit on each product sale. The challenge continues to be to create eye-catching graphics or packaging at a very low cost or even with a cost that is similar to packaging already used in present products. Lenticular labels presently provide more desirable effects and graphics than holographic labels as lenticular technology allows the use of accurate color while holographic labels typically require large amounts of light often not available in retail environments and often do not reproduce colors effectively. There is a direct relationship in lenticular lenses between lens thicknesses and lenticules per inch (LPI) or frequency and the resulting quantity of data and the overall graphic quality and effect achieved by the lenticular labels, which directly affects the labels cost and physical thickness. In other words, creating a desirable graphic is often a balancing act between adding data and increasing thickness of the lens and reducing material costs and label thicknesses. Similarly, a typical cost-cutting technique of container manufacturers is reducing the thickness or overall material used in the container and container walls. Some efforts have been made to utilize thin lens technologies to provide more data and enhanced graphics with less materials and reduced material costs, but the overall graphic effects have been only minimally successful with marginal quality and effectiveness.

Hence, there remains a need for a method and system of using lenticular lens technologies in standard containers to produce enhanced graphic effects to provide improved marketing capabilities for the container and product in the container. Preferably, such a method and system facilitates production of containers at a cost that is comparable to the cost of producing existing containers that do not incorporate lenticular lens technologies with similar material thicknesses and with similar container strengths.

SUMMARY OF THE INVENTION

The present invention addresses the above problems by providing a lenticular lens systems with a lenticular lens array fabricated as part of the container to be integral with one of the container walls. In other words, the container itself is used to construct a lenticular lens array to focus on a selected portion of the container in which a printed image is positioned. In one embodiment, the lenticular lens array is integrally formed in a front portion of a clear container wall to focus on a rear portion of the container wall with the lenticules on an exterior surface of the container. A label or other image presentation element is attached to the container so as to precisely position a printed image adjacent the rear portion of the container upon which the lenticular lens assembly is focusing. The lenticular lens assembly can be configured to produce a graphical image from the printed image at a number of locations within the container or, in some cases, outside the container. In one embodiment, the graphical image is displayed so as to appear to be floating within liquid contents of the container, such as water or other clear or translucent liquid, in the center of the container. The space or distance in the container between the lens array and the rear portion of the container is selected to facilitate focusing a powerful lens on the rear portion to enable a wider or more coarse lens array that has space to carry more data and/or more images, which creates a greater overall visual effect.

In an important embodiment of the invention, the lenticular lens system includes a lenticular lens array that is formed in a rear portion of a container wall with the lenticules formed on an interior surface of the container wall so as to focus on a printed image on a label (or on the exterior of the container wall) attached to the container wall. A viewer would look through a clear front portion of the container wall, through the bottle (and its contents), through the lens, and to a focal point directly behind the lens array. This embodiment is useful with glass containers that provide a greater optical gain due to the thicker walls of the container. This arrangement can be thought of as a lens in the container arrangement that is quite different from prior uses of lenticular sheets that were glued to exterior portions of containers. A lens-in-the-container arrangement is also useful for flexible or collapsible drink containers (such as juice pouches) in which a clear window is provided in a front wall (such as a wall containing a straw hole) and a lens array is provided in the rear wall of the container. The lens array is mapped to a printed image provided directly behind the lens array on the rear wall. Typically, the walls are metallic and opaque behind the printed image.

The lenticular lens array are configured or designed based on a lens fabrication process that utilizes a number of mathematical relationships of the lens array and container physical characteristics (such as lenticules per inch, radius of each lens or lenticule, viewing angle of the lens array, and curvature of the container wall) to create a focal point on the back of the container upon which the interlaced printed image(s) is placed or positioned with the label element. The label or printed image presentation element are attached to the container such that corresponding lenticules in the lens array in the front portion of the container wall are registered or mapped with the interlaces printed images on the label, which typically correspond to the lenticules in frequency. In some embodiments, the printed images are instead printed directly on the rear portion of the container wall (such as on the exterior wall of a glass or plastic bottle or container). The produced or viewed graphical images may be any of a number of images, such as 3D images or animation and effects may include full action video clips to images in full 3D that are floating in the container. The shape of the container walls, such as cylindrical or frustoconical, provide an optical advantage in that the a viewer can see around the produced images, which enhances a produced 3D effect. The cost of manufacturing a container with the lenticular lens system is significantly less than the cost to apply a lenticular lens label or attach a lenticular insert and is often comparable to the cost of producing the container without the added system (i.e., there is no or very little added material costs and relatively low original engineering costs and added manufacturing costs).

In one embodiment, the lenticular lens array is replaced with another useful lens configuration for focusing on the rear portion, such as a fresnal lens array, and in some embodiment, one or more light collection lenses are provided at different locations on the container walls to collect light and focus it on the rear portion and/or printed image to enhance the produced graphical image. Typically, the lenticules in the lens array are positioned to run vertically or parallel to a central axis of the container to provide 3D effects or graphical images. However, in other embodiments, the lenticules may extend horizontally or transverse to the central axis of the container to provide graphical images with movement.

More particularly, a container is provided with a lens system for producing a graphical image visible from the exterior of the container. The container includes a container wall with a front portion and a rear portion separated by a distance (such as the inner diameter of a cylindrical container). A lenticular lens array is provided integral with the front portion of the container wall with a first optic surface, e.g., a plurality of parallel lens or ribs providing lenticules, contiguous with an exterior surface of the container wall and second optic surface or transparent layer contiguous with an interior surface of the container wall. The lenticular lens array is configured with a focus distance substantially equivalent to the distance between the front and rear portions or with a focal point on or about the rear portion of the container wall. The container further includes a printed image, such as an interlaced image, positioned near the focal point on the rear portion of the container wall. Typically, the printed image is positioned so as to be registered or mapped to the lenticules of the array and may be printed directly on the exterior surface on the rear portion of the container wall or printed, such as with mirror printing, on a label which is then attached to the exterior surface of the container wall. In some embodiments, a lens element is also provided in the container wall to collect light striking the lens element and direct it toward the printed image or focal point.

In some cases, the invention provides a lenticular lens structure that is not integral with the container walls but is instead provided with a wrap around label, a decal, or a lens insert. In one particular embodiment, a container is provided that is adapted for producing a graphical image. The container includes a container wall with a front portion and a rear portion. A label is included that extends about the circumference of the container with an inner surface contacting an exterior surface of the rear portion of the container wall and contacting an exterior surface of the front portion of the container wall. The label includes a lenticular lens array integral with the label to include a plurality of lenses formed (such as through embossing and the like) on the outer surface of the label. The lenses have a focal point on or about the rear portion of the container wall with the lenticular lens array positioned near the front portion of the container wall. To achieve the graphical image, a printed image is provided and positioned proximal to the focal point. The printed image may be an interlaced image printed on the inner surface of the label. The label can readily be applied to the container wall through heat shrinking or other methods well known in the packaging industry as the label typically is a clear plastic, such as PVC, PET, APET, polyethylene, polypropylene, or the like.

In some other embodiments, a container is provided that includes a lenticular lens insert having a plurality of lenticules on one side and have a smooth opposite side. An indentation is provided in one of the container walls and the insert is placed within the insert. In some cases, the lenticules face outward or are distal to the container wall. In these cases, a printed image may be provided on or near a rear wall of the container opposite the indentation. The printed image may be printed on the rear wall in a data area on the interior or exterior surface of the rear wall or may be provided on a decal or on a wrap around label. If provided on a wrap around label, the label may be used to retain, at least partially, the insert by having the label cover (at least partially) the lenticules of the insert. In other cases, the label is positioned between the insert and the container wall (i.e., the label is affixed prior to placing the insert and the sandwiched label material becomes part of the lens structure).

DETAILED DESCRIPTION OF THE PREFERRED EMBODIMENTS

Figure 1:
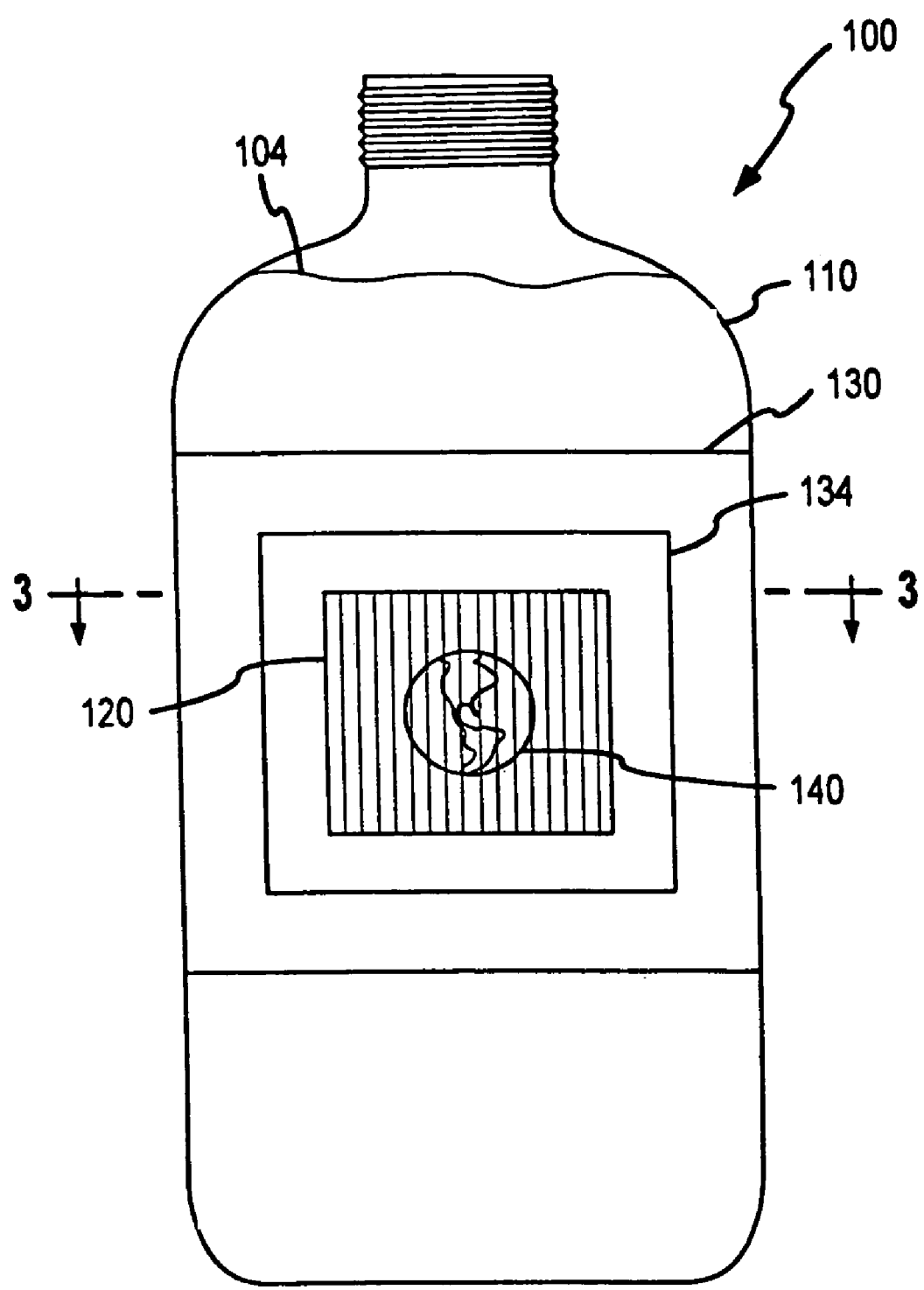
FIG. 1 is a front view of a container, i.e., a bottle for water and the like, showing an image viewable through a lenticular lens array formed in the front portion of the container wall (i.e., as a one-piece unit or integral or contiguous with the container wall) with the printed image provided on the inside of a label wrapped around the container and placed (or registered) adjacent the rear portion of the container wall.
Figure 2:
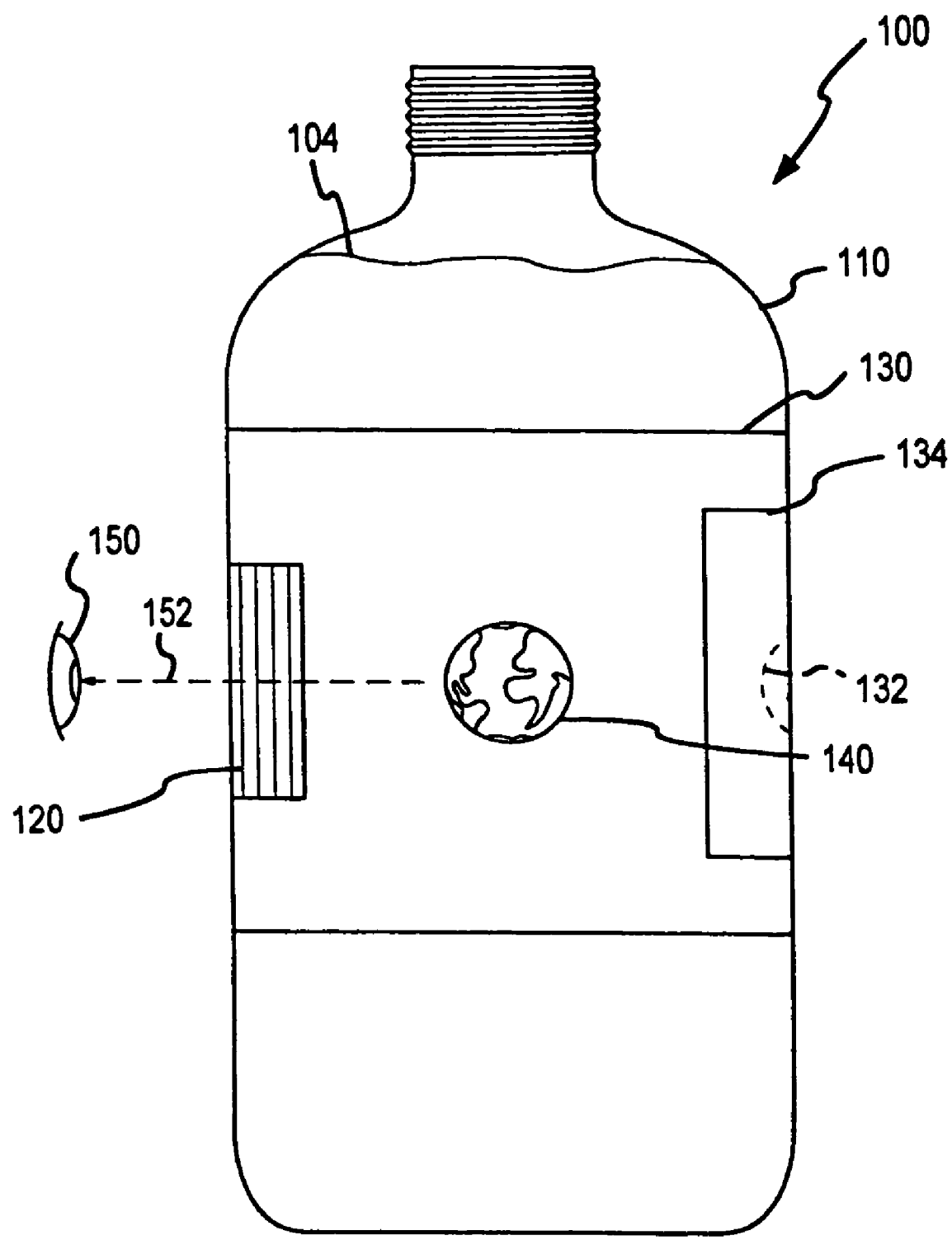
FIG. 2 is a side view of the container of FIG. 1 showing the image created in the center of the bottle (i.e., "floating" in the container contents) by the combination of the front lenticular lens array and the rear printed image on the label.

FIGS. 1 and 2 illustrate a container 100 utilizing a lenticular lens system of the present invention to produce a floating 3D image 140. As shown, the container 100 is provided with a standard shape utilized for typical plastic bottles used for distributing water or other beverages. As such the container 100 includes a clear or translucent container wall 110 having a substantially cylindrical shape for containing liquid 104. The container wall 110 is typically formed of glass or more typically of a plastic such as polyvinyl chloride (PVC), polypropylene, polyethylene, polyester (such as PET, APET, PETG, and the like) or other plastic used by the packaging or container industry. The container 100 may be formed by blow molding, injection molding, or any other technique useful for producing containers and adapted (as necessary) for the glass or plastic material used to fabricate the container 100.

According to an important aspect of the invention, a lenticular lens array 120 is provided in a front portion of the container wall 110. The lenticular lens array 120 is formed integral with the container wall 110, typically in the same molding or other fabrication process and of the same material. The lenticular lens array 120 is configured with numerous lenticules or lenses formed by ridges or ribs that extend parallel to each other and to a longitudinal axis of the container 100. The lenticules of the lens array 120 are configured in frequency (lenticules per inch) and shape (such as width and radius) based on the material of the container wall 110 (and array 120), based on the liquid contents 104 of the container 100, and the curvature of the container wall 110 to focus on the rear portion of the container wall 110. The space or distance (i.e., the inner diameter of the container) allows a coarser configuration for lens array 120 to be used while still providing a large quantity of data in the printed image 132. The lenticular lens array 120 can have a wide variety of dimensions (such as a height and "width") selected based on the size of the container 100 and the size of the printed image 132 and shapes (such as a square, a rectangular, a triangle, a circle, an oval, or any other useful shape for viewing the image 132).

With the lenticular lens array 120 focusing on the rear portion of the container wall 110, a graphical image 140 can be produced within the container so as to "float" in the liquid 104 or elsewhere by providing a printed image 132 at the focal point. In this regard, a label or printed image presentation element 130 is provided with a printed image 132 on the inner surface of the label 130, i.e., the portion abutting the rear portion of the container wall 110, which is shown in FIG. 2. The label 130 is shown to be wrapped around the container wall 110 so as to cover the lens array 120 and the rear portion of the container wall 110. The label 130 fabricated from a clear material such as plastic so as not to interfere or block light from passing through the lens array 120, which allows a viewer 150 to see as shown by a sight line 152 the graphical image 140 which is produced by the lens array 120 and the printed image 132.

The label 130 includes a data area or backdrop portion 134 in which a printed image 132 is provided, and in some embodiments, the data area 134 includes additional images, such as text, for viewing or may provide a background color(s) useful for emphasizing or highlighting the printed image 132. The printed image 132 is positioned relative to the rear portion of the container (i.e., the focal point of the lenticular lens array 120) to map or register the interlaced printed image 132 with corresponding lenticules or portions of the lenticular lens array 120 to effectively produce the graphical image 140 to the viewer 150. The image 132 may be printed using known techniques for printing images or data to achieve graphics such as 3D, animation, or action and for use with lenticular lenses or lenticular materials but the invention is not limited to a specific technique. For example, the image 132 may be printed upon the interior or reverse side of label 130 via web or offset press operations to form an ink layer with corresponding interlaced images in conjunction with the appropriate mathematics of the lens materials and configuration of array 120. The mathematics preferably not only matches the lens materials but also the distortion caused by the curvature of the container wall 110 and integral array 120 and of the liquid 104 in the container 100. In the case of a bottle or other conical shaped container 100, the lens or lenticules of the array 120 "open up" and create a new mathematical pitch. This pitch is predetermined before the labels 130 and plates are made and printing occurs so that the printing can be performed with more accuracy and to facilitate registering the label 130 and printed image 132 with the lenticular lens array 120.

Figure 3:
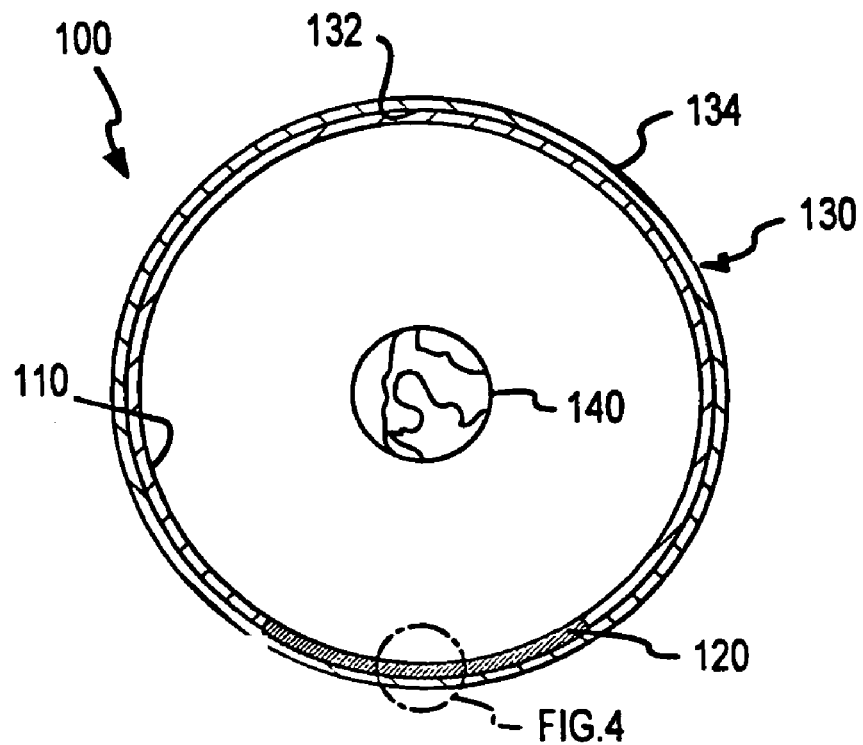
FIG. 3 is sectional view of the container of FIG. 1 looking downward on the container wall showing the lenticular lens array and the label with a registered printed portion.

FIG. 3 shows a sectional view of the container 100. As shown, the lenticular lens array 120 is integral with the container wall 110 with vertically extending lenticules forming a rough exterior surface at the front portion of the container wall 110. Generally, the lenticular lens array 120 has the same overall thickness as the wall 110 and is configured to have a focal point substantially coinciding with the rear portion of the container wall 110 adjacent the printed image 132 of the label 130. The label 130 is shown to wrap around the entire periphery of the container wall 110 as is common practice in the beverage industry (such as in the bottled water industry), but in some embodiments (not shown), the label 130 may extend for only a portion of the periphery of the container wall 110 as long as the printed image 132 is positioned adjacent an exterior surface of the rear portion of the container wall 110 that coincides with the focal point (or points) of the lenticular lens array 120.

The fabrication of standard lenticular material sheets, i.e., those not formed as part of a container wall 110, is well known by those skilled in the printing arts and such knowledge may be utilized at least in part in designing the molding or arrangement of the lenticular lens array 120 (in combination with the use of the design formulas discussed with reference to FIGS. 10-13). For example, lenticular material fabrication is described in U.S. Pat. No. 5,967,032 to Bravenec et al. and U.S. Pat. No. 5,753,344 to Jacobsen, which are incorporated herein by reference. Additionally, the method of laying out or arranging inserts (or labels 130) for a conical container similar in some ways to container 100 is illustrated in FIG. 1 of U.S. Pat. No. 5,908,590 to Yoshimi et al., which is incorporated herein by reference, which is directed to producing labels for foamed resin containers.

Figure 4:
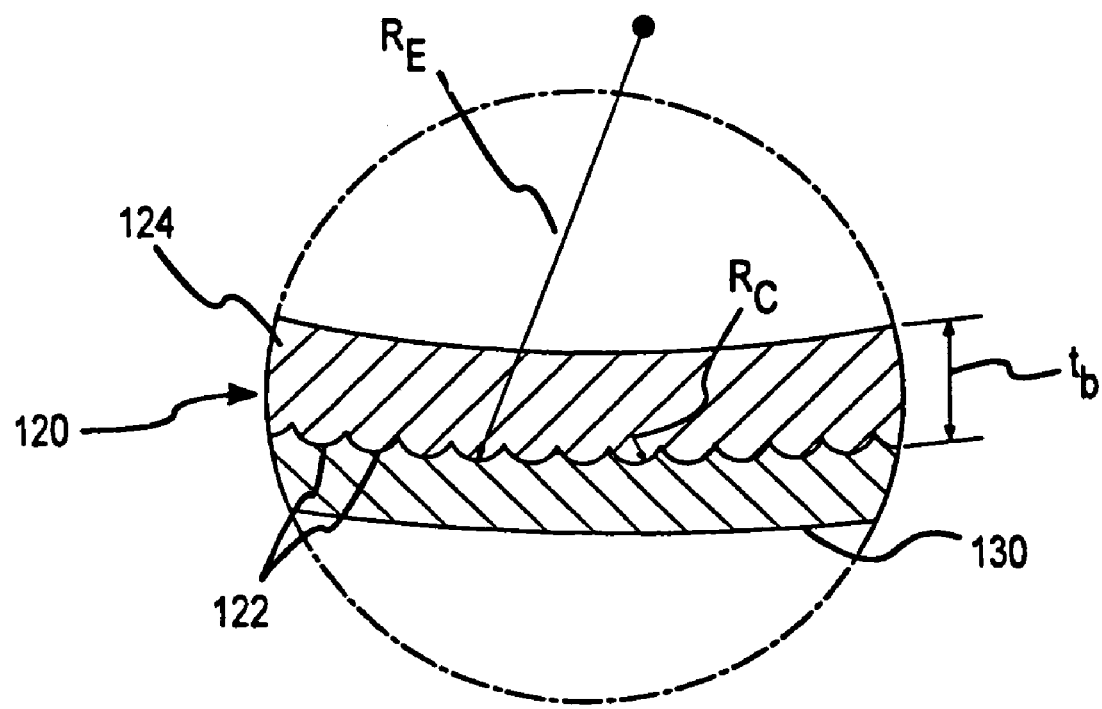
FIG. 4 is an enlarged view of part of the sectional view of FIG. 3 illustrating in more detail the lenticular lens array formed integrally with the container wall.

FIG. 4 illustrates a portion of the cross-section of the lenticular lens array 120 and label 130 shown in FIG. 3. As shown, the label 130 is wrapped about the container wall 110 so as to contact the ridged outer surface of the lenticular lens array 120. Typically, the label 130 is fabricated from a very thin sheet of clear plastic to minimize distortion through the array 120. The lenticular lens array 120 includes a plurality of optical ridges or lenses 122 (extending vertically as shown or horizontally) and a transparent lens layer or web 124. The fabrication and/or design of the lenticular lens array 120 is discussed in detail (including using mathematical formulas of the invention in the design processes) with reference to FIGS. 10 and 11, and for now, it is adequate to understand that the array 120 has an overall thickness, $t_B$, that affects focusing of the array 120 and typically is substantially equivalent to a thickness of the container wall 110 (although in some cased the array 120 may be slightly thicker or thinner to provide a desired optical effect and/or provide a desired structural strength). Optical results of the array 120 are also determined by other physical characteristics of the array 120 including the material of the array 120, the frequency of the lenticules or ridges 122 (typically measured in lenticules per inch (LPI)), the curvature of the array 120 as determined by the curvature, $R_E$, of the container wall 110, and the radius (or width) of the lenticules or lens, $R_C$, and the relationships between these characteristics or design parameters. Additionally, the resulting optical effect is determined in part by the liquid 104 (or lack of liquid) in the container 100 and the distance from the lens array 120 to the rear portion of the container wall 110 (and the printed image) which is approximately the inner diameter of the container 100 at the location of the array 120 and the printed image 132.

Figure 5:
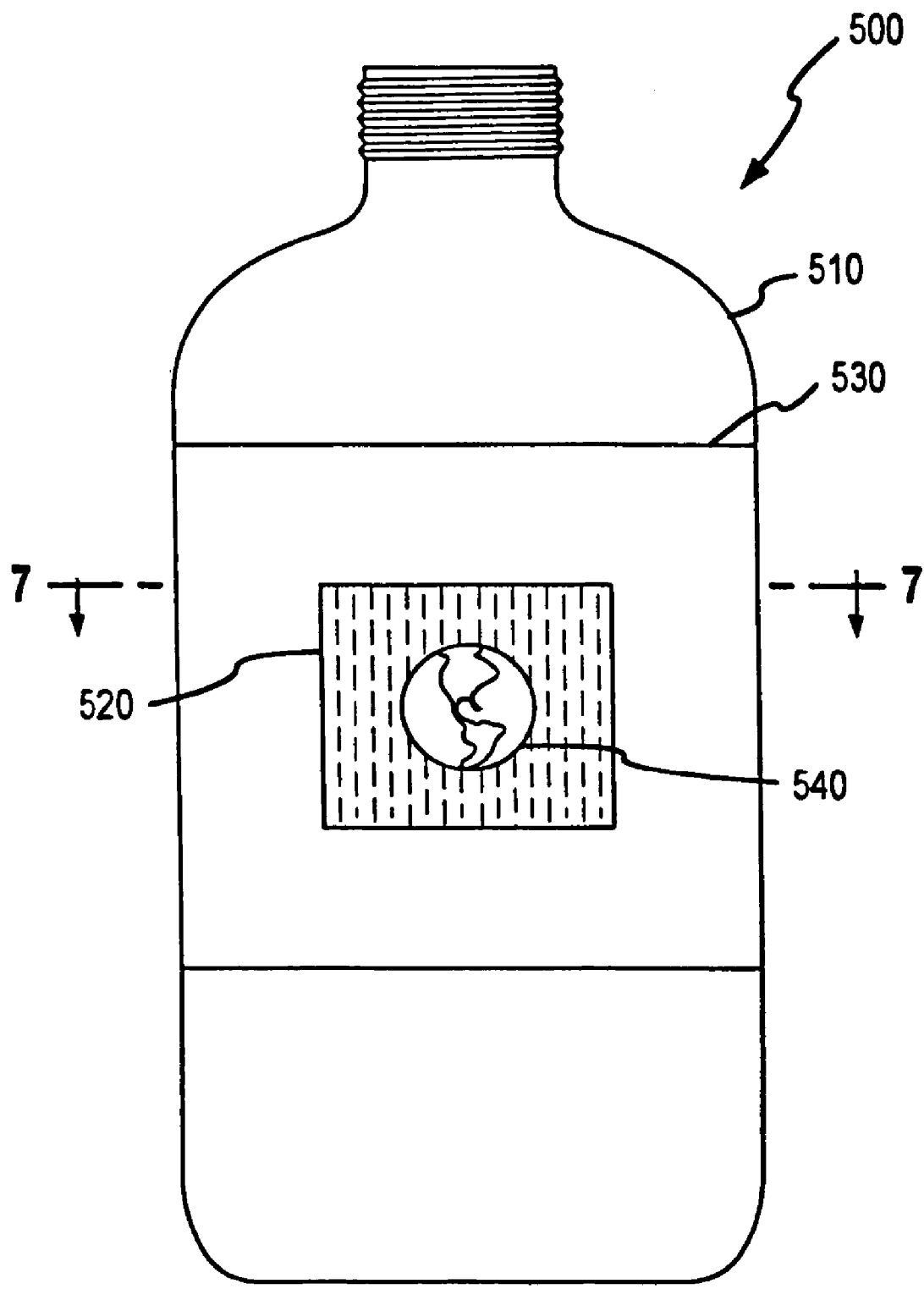
FIGS. 5, 6, and 7 are similar to FIGS. 1-3 and show another embodiment of a container fabricated according to the invention utilizing a lenticular lens array formed integrally with the rear wall of the container adjacent a printed portion of a label installed externally to the container and function in combination to focus an image on the rear wall of the container.
Figure 6:
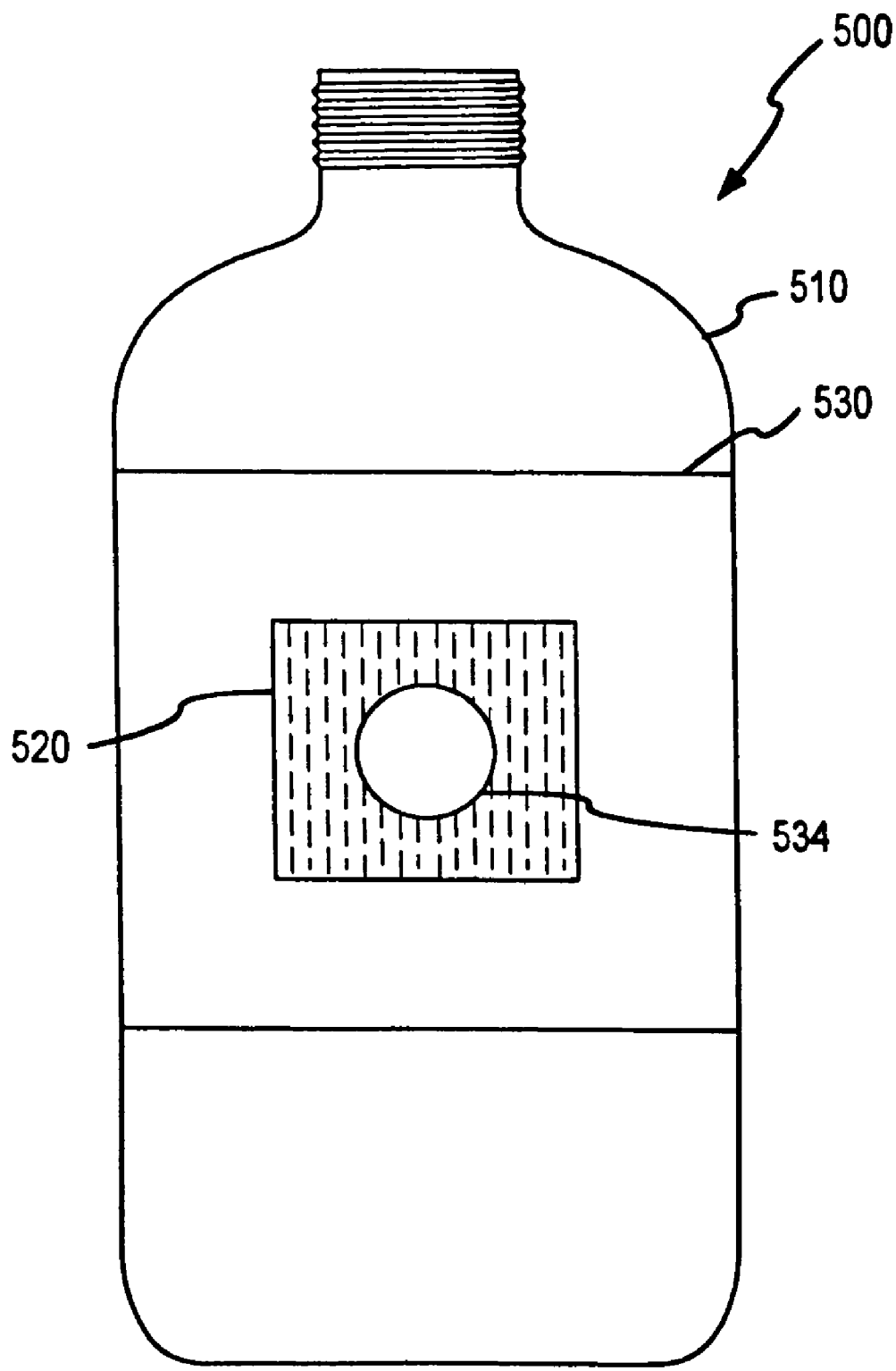
Figure 7:
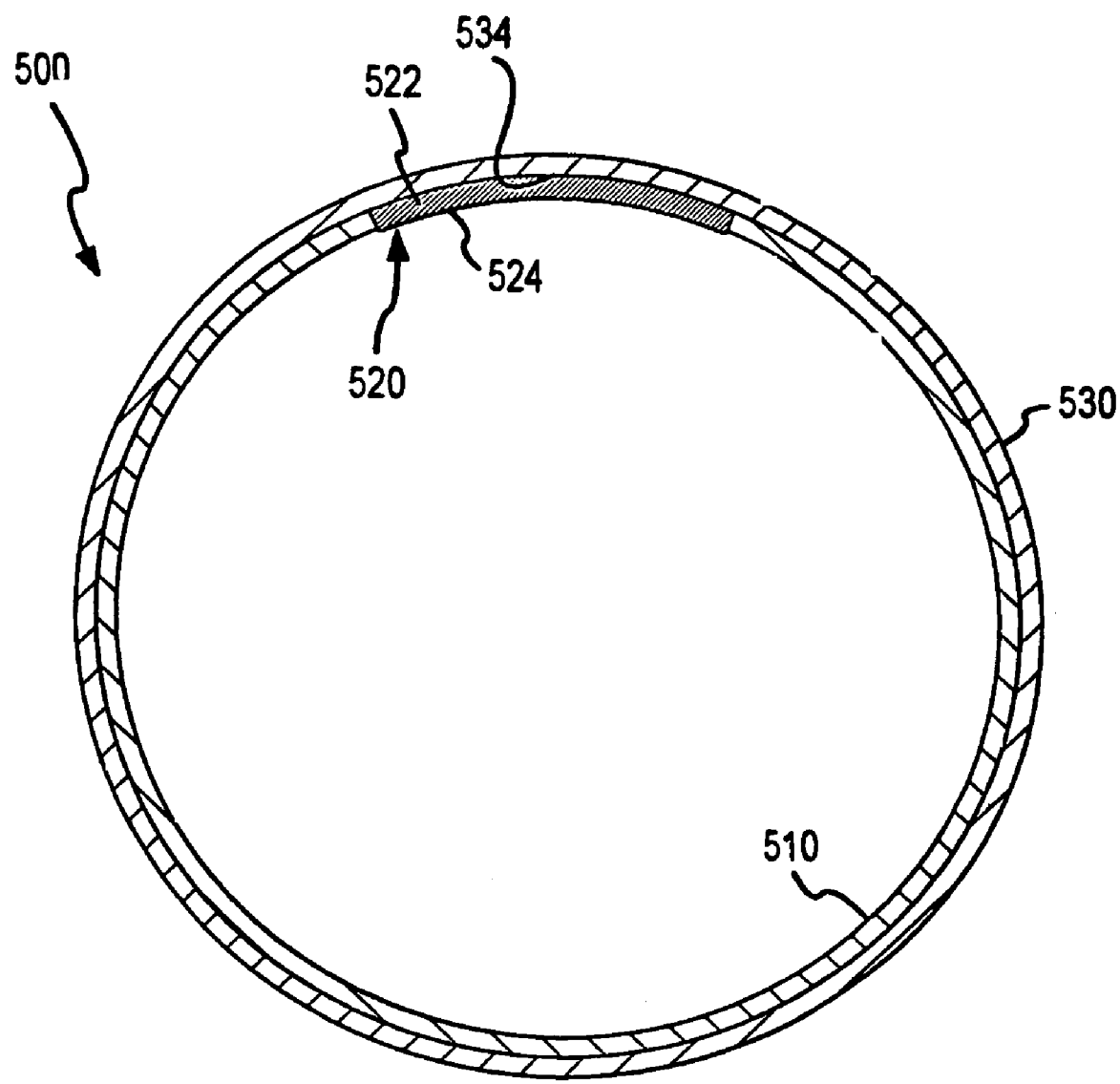

FIGS. 5-7 illustrate another container including another lenticular lens system of the invention, i.e., a system in which the lenticular lenses are provided integral with a portion of a container wall that is printed with data or a printed image (interfaced image) or abuts a label or presentation element having such data or printed image. As shown, the container 500, e.g., a plastic water or soda bottle, a soap or other similar container, or a glass bottle, jar, and the like, includes a container wall 510. A lenticular lens array 520 is formed integral to a rear portion of the container wall 510 and includes a plurality of lenticules or ridges on an inward facing side 524 and a flat layer 522 facing the exterior portion of the container 500. The lenticule surface 524 is configured to focus on the flat surface 522 (or the interface between the flat surface or layer 522 and the abutting label or presentation element 530). The label 530 is wrapped around or attached to the exterior surface of the container wall 510 so as to at least partially cover the lenticular lens array 520 and more importantly, to map or register a printed image 534 to the lenticules of the array 520 so as to create graphical image 540 as viewed through the front portion of the container wall 510. The mathematics used in configuring the lenticular lens array 520 are similar to that used in creating flat lenticular material or sheets with compensation for the curvature of the container wall 510 and integral lenticular lens array 520 (note, however, this is a closing or pinching of the lenticular surface 522 rather than an opening as experienced with the lenticular lens array 120 of FIG. 1). The specific location of the array 520 is not limiting to the invention as long as the printed image 534 is placed behind it on or adjacent a corresponding container wall 510 location. Similarly, the size and shape of the array 520 (as well as the orientation of the lenticules) can be varied widely to practice the invention with the array 520 typically being selected to have a size and shape that is larger than or the same size as the printed image 534.

Figure 8:
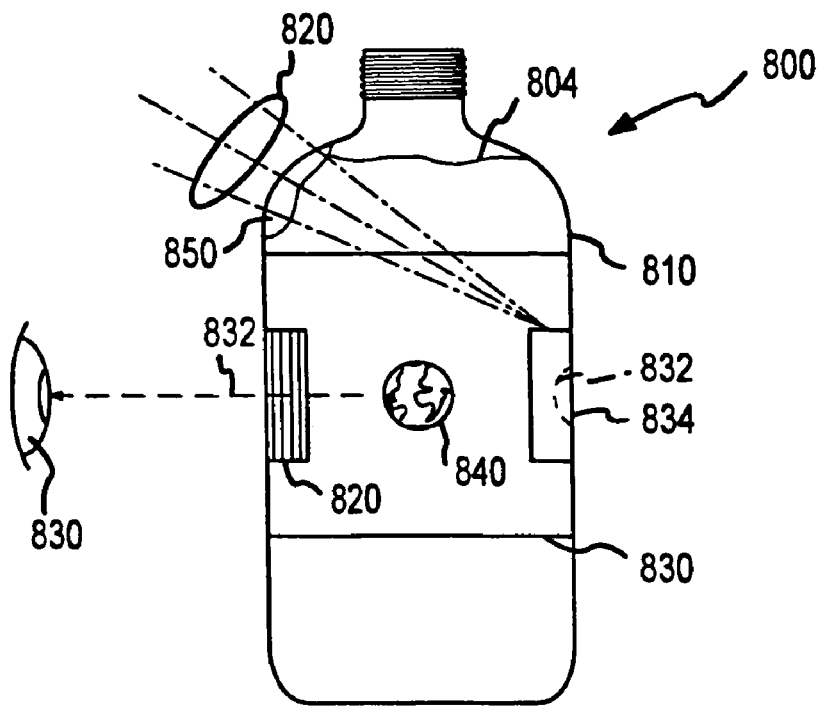
FIG. 8 is side view of another embodiment of a container similar to the container of FIGS. 1-4 including a lenticular lens system that further includes a light collecting lens in an upper portion of the container wall configured for focusing light on the printed side of the label element adjacent the rear wall of the container.

FIG. 8 illustrates another embodiment of a lenticular lens system that is useful for enhancing the clarity and effectiveness of the created graphical image. The illustrated container 800 includes a lenticular lens system similar to that used in container 100 of FIG. 1 with a lenticular lens array 820 in a front portion of a container wall 810 containing water or other liquid 804 and a label or presentation element 830 with a background or data area 834 with a printed image (interface printing layer) 832 abutting the exterior of the rear portion of the container wall 810. The system of the container 800 is enhanced by the addition of a light collection lens (such as a fresnel lens or other useful lens configuration) 850 which is formed integrally with the container wall 810 at a location or position useful for collecting light and directing or focusing the collected light 820 onto the rear portion of the container wall 810 and more preferably on the portion of the container wall 810 abutting the data area 834 and even more preferably on the portion of the container wall 810 abutting or adjacent the printed image 832. In this manner, the graphical image 820 produced for viewing by the viewer 830 along line of sight 832 is typically more vivid with better color reproduction and image or effect clarity.

Figure 9:
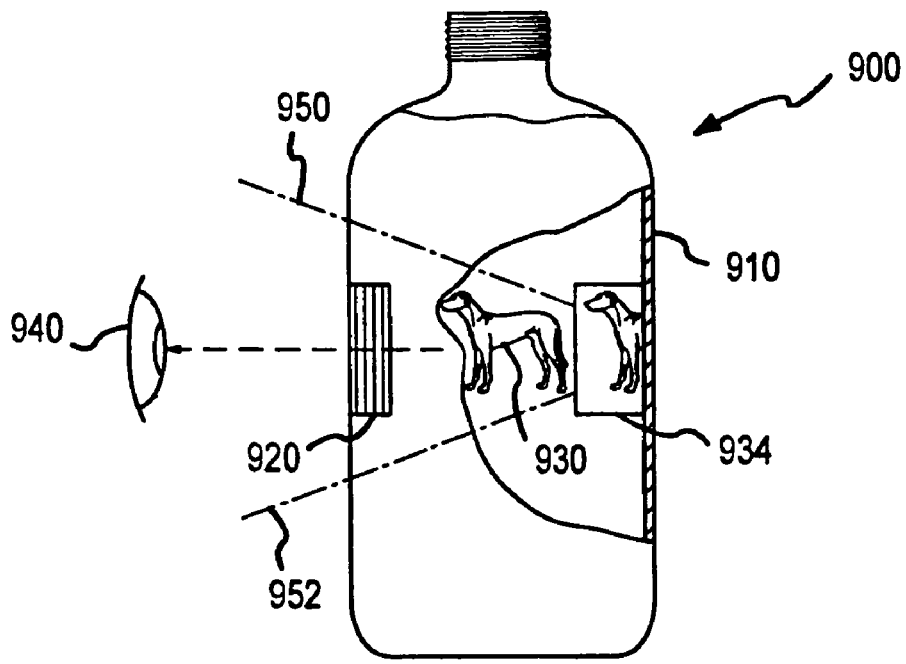
FIG. 9 is yet another embodiment of a container, such as a glass bottle, with a lenticular lens system that includes a front lens array and a printed image integral to the rear container wall (e.g., printed on the external portion of the container rear wall or formed within the wall itself during fabrication)

FIG. 9 illustrates a container 900 in which a label is not utilized but instead data and/or interlaced images are printed directly on an exterior surface (or within) a container wall. Such a container 900 may be fabricated from plastic or glass (such as a liquor bottle for distributing vodka and other alcoholic beverages that are relatively clear or translucent). As shown, the container 900 includes a frontal lenticular lens array 920 with lenticules facing outward or forming an external surface and focusing on a rear portion of the container wall 910 having a data portion with a interlaced printed image 934 (which is typically, but not necessarily, printed on the external surface of the container wall 910). As a result of light (shown by lines 950 and 952), the array 920, and the printed image 934, a viewer 940 is able to see the graphical image 930, which in this embodiment is shown to be displayed or created in the middle of the container 900 to be "floating" in the container 900.

Figure 10:
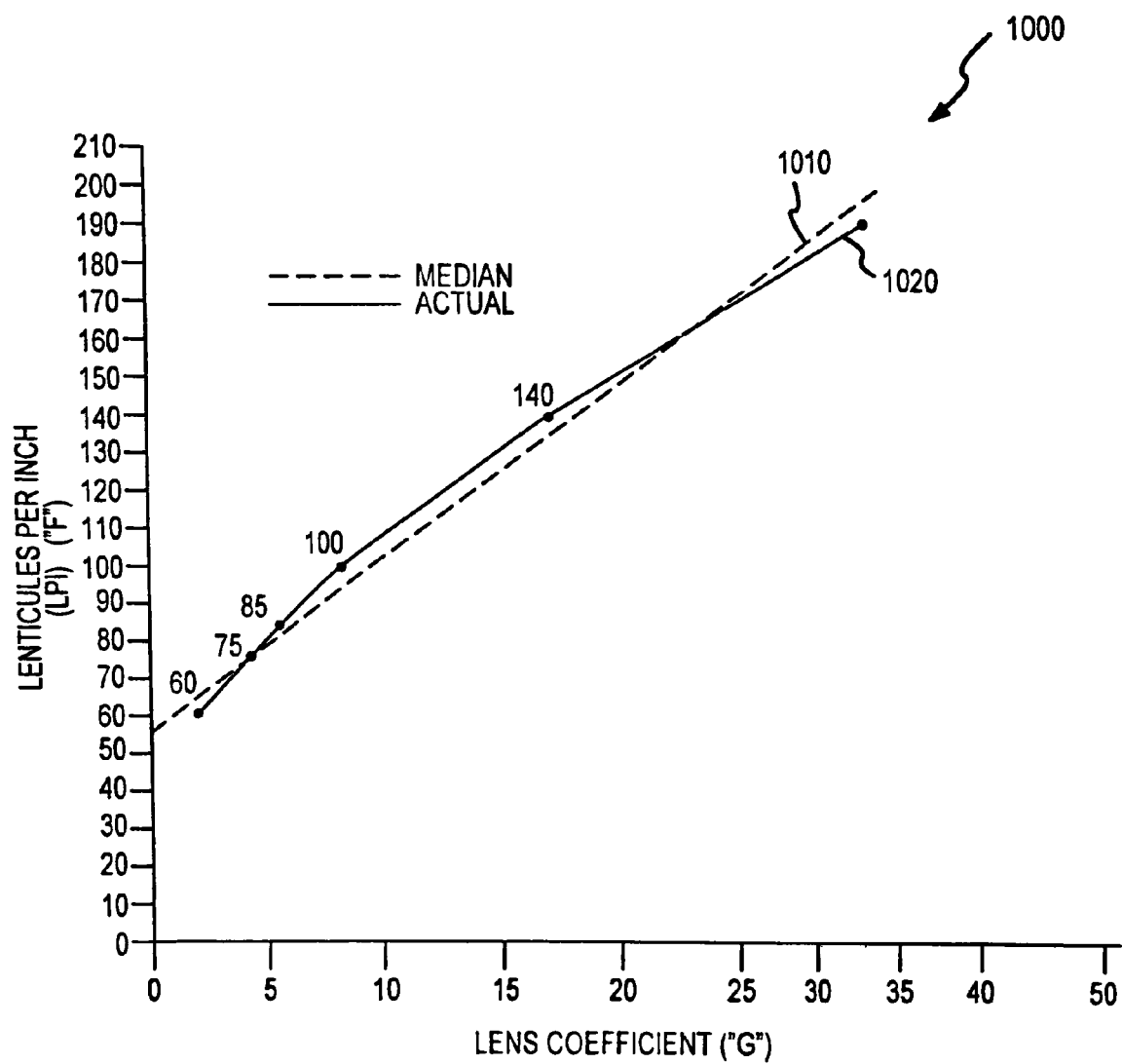
FIGS. 10 and 11 are graphs illustrating, for two exemplary viewing angle and lens radius combinations in a lenticular lens array, a relationship between lenticule frequency as measured in lenticules per inch and the lens coefficient as calculated by a process of the invention used in fabricating lenticular lens systems and as measured in fabricated lens systems.
Figure 11:
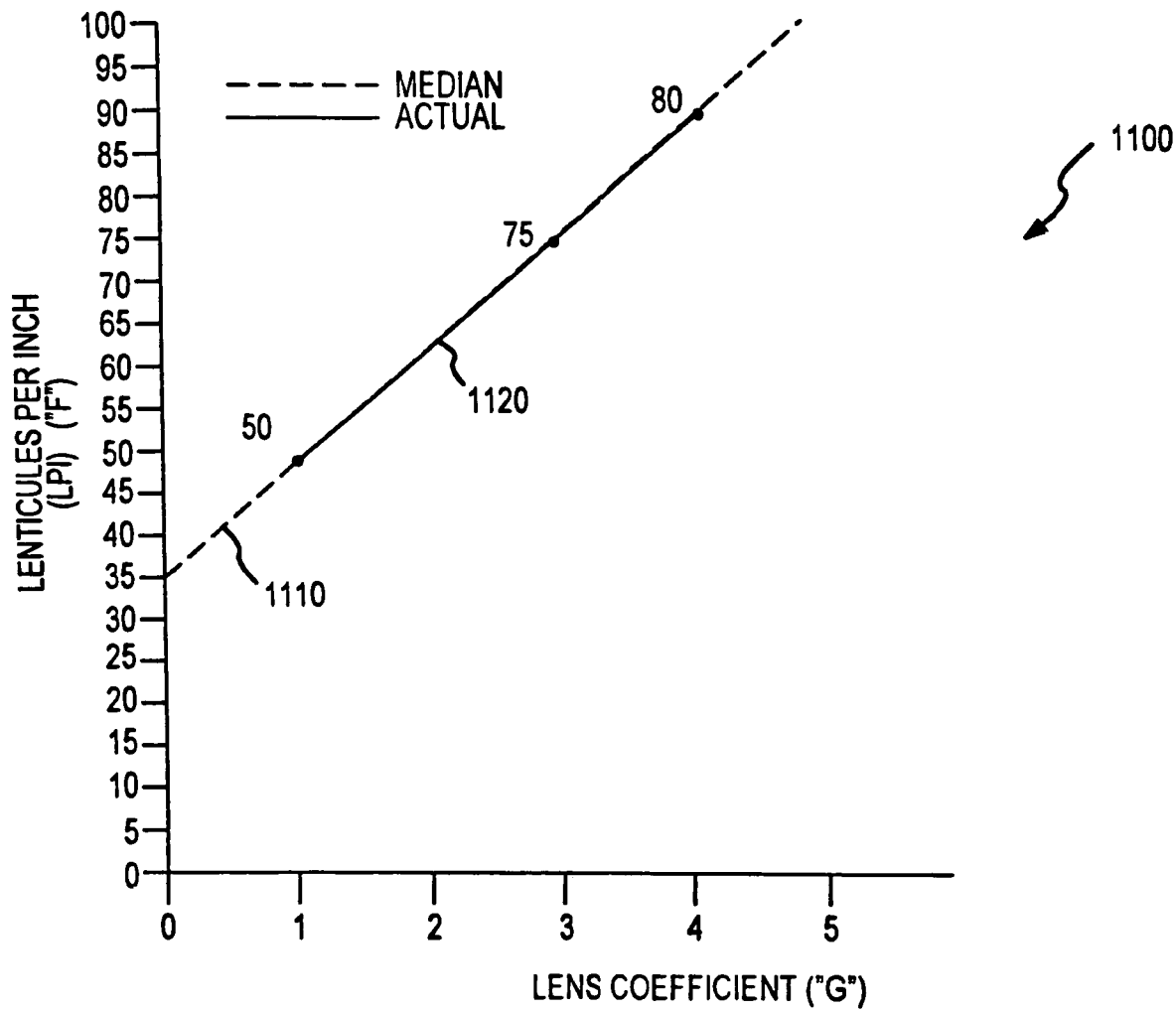

As stated earlier, the method of fabricating the containers with lenticular lens systems can be any of a number of molding or other techniques known within the container or packaging industry. Preferably, however, the lenticular lens array is fabricated to focus on the rear portion of the container (adjacent a printed image on the wall or on a label registered to the lenticules of the array), and such focusing depends on the interactions of a number of array characteristics or design parameters, on the container itself, and the contents of the container. Further, there is a relatively wide arrangement of container designs with differing wall thicknesses, materials, and inner diameters. For example, the wall thickness of the container can exceed 100 mils in some glass containers or be less than 10 mils in many disposable containers, such as PET or other plastic containers used for water, soap, and other products. However, to control costs and maintain strengths, it is typically desirable to match the thickness of the lens, $t_B$, to the container wall 110, while the other array 120 parameters can be varied to provide a desired result once a thickness, $t_B$, container size and curvature, and material are known and the design process of the invention provides a method of determining useful values for the array 120 characteristic or design parameters. In this regard, the following discussion along with reference to FIGS. 10 and 11 provides a description of how fabrication and design of a lenticular lens array for a system and container of the invention can be performed efficiently and accurately through the use of the disclosed mathematical formulas and processes.

Referring first to FIG. 4, there is a direct relationship between the lenticule lens array thickness (or container wall thickness), $t_B$, the lenticule frequency (e.g., LPI), and both the amount and quality of data and the overall graphic quality and effect provided by the lenticular lens system. In general, as lens thickness increases, $t_B$, the size of the lenticule (as indicated by the width or radius, $R_C$, of the lens ridge 122) gets larger. Hence, the thicker the lenticule ridge 122 the more data that can be placed under the lenticule 122 on the printed image 132 and the better overall 3D, animated, or other effect can be achieved in graphical image 140. According to one aspect of the invention, a mathematical or formulaic process is used to create or design the lenticular lens array 120 and is adapted such that the lens thickness, $t_B$, lenticule frequency (LPI), radius, $R_C$, and other array and system parameters such as viewing angle and array/container curvature work in unison to create a desired lens, with selected parameters being set to obtain a desired result (such as better 3D effects or better animation) and then adjusting other parameters to support the preset characteristics (such as curvature, liquid optical properties, material of the container, and size of the container for separation between the lens array 120 and the rear portion of the container wall 110). Significantly, by placing the lenticular lens array 120 on the front portion of the container wall 110 and the interlaced printed image 132 on the rear portion of the container wall 110, the thickness of the lens, tB, can be significantly reduced due to the increased focal length (i.e., container inner diameter) while still obtaining more effective 3D, animation, and other higher data effects than similar sized lenticular material in which the image is adjacent the lenticules 122 and web 124.

In general, it is desirable to minimize the use of excess materials for the lens array 120 in most plastic container applications. To provide a desirable or effective graphic effect in these applications, it is desirable to use the most effective or powerful lenticular lens array configuration as possible with a given container wall thickness. In practice, such lens arrays generally have viewing angles of 45 degrees or more and more radical lens radii, $R_C$, of 4 to 8 degrees. Many popular and functional lens array configurations that can be used for array 120 that are good for 3D and animation have viewing angles in the 47 to 50 degree range with lens radii in the 4 to 6 degree range, and many manufactured lenticular materials have viewing angles of about 48 degrees with 5 degree lens radii, which are readily manufactured and are compatible for existing printing technologies. These ranges are provided for exemplary purposes and not as a limitation as these parameters may readily be altered to practice the invention as long as the parameters of the array discussed below are selected to substantially comply with the following mathematical relationships and dependencies.

In the past, lenticular lens design has involved a relatively large amount of guesswork with success depending on a designer or manufacturers prior experience and knowledge. The design problem is compounded for the lens arrays (such as array 120) included in container walls as the arrays are made of a number of materials that must be calibrated or matched to the curve or shape of the container wall (and integral array). In practice, the thickness of the container wall (and hence of the lens, $t_B$) is known or set and the material of the lens array and container wall is preselected, which provides a known refractive index for the lens array. The refractive index of a material relates to the rate at which the material can bend white light, with the higher the index the less thickness is required to bend the light (which is desirable in most container applications to control material costs). While numerous materials may be utilized to fabricate containers, most plastic containers are made of PET, which has a similar refractive index to APET and PETG, and hence, the following examples employ PET as the container wall and lens array material.

The following symbols are used: "A" for the refractive index of the polymer or the glass of the container wall and lenticular lens array; "B" for the thickness of the lens array (i.e., $t_B$); "C" for the radius of the top of an individual lens (i.e., $R_C$); "D" for the viewing angle of the array; "E" for the curvature of the container (i.e., $R_E$); "F" for the frequency of the lenticules typically provided in units of LPI; and "G" for the lens coefficient (which was determined by inventors to be the ratio of F/B). Also, in the following example, parameters or design variables A, C, D, and E are presumed constant and known. The established goal for these design examples are to calculate or determine a working lens frequency for a PET container that has a viewing angle, D, of about 48 degrees, a 4 to 6 degree radius, C, and a thickness, B, of 10.4 mils (e.g., a common container thickness).

In order to determine a useful lenticule frequency, F, a "lens coefficient", G, is calculated to determine the mathematical relationship between existing lens arrays in the marketplace that perform well in lenticular printing applications. In theory, there should be a close or nearly exact mathematical relationship between a calculated or designed lens array and an actual lens array that when graphed would present itself as nearly a straight line or median in which the thickness of the lens, B, required in the lens material at a particular frequency, F, could be determined and/or more importantly, the frequency, F, could be determined that would be necessary to complete a lens array within the restraints of a given or existing container wall thickness and design.

The coefficient, G, is provided by the ratio of F/B (or G multiplied by B equals F). If the thickness, B, is 10.4 mils and G can be determined to be 11.53 from working or existing lens arrays with about the desired viewing angles, D, and lens radius, C. Hence, in this example, the lenticule frequency, F, is 120 LPI (i.e., 11.53 multiplied by 10.4). In this example, G is obtained from the graph 1000 shown in FIG. 10 which shows the graphing of the relationship of frequency, F, to lens coefficient, G, as determined from an actual relationship in a fabricated lens array as shown by curve 1010 from which a straight line relationship of the lens coefficient, G, is obtained with median line 1020. The graph 1000 is based on a known or existing lens array with a viewing angle of 48 degrees and a 4 to 6 degree lens radius, C, along with a constant refractive index for the material of the lens array, A, and a known curvature of the container, E. The actual curve 1010 was prepared based on the measurements of frequency, F, of 60, 75, 85, 100, 140, and 200 LPI with corresponding thicknesses, B, of 28.5, 18.3, 14, 12, 8, and 6 mils, which led to lens coefficients, G, as graphed of 2.1, 4.09, 5.66, 8.33, 17.50, and 33.30.

FIG. 11 illustrates a similar graph 1100 showing the relationship between the lenticule frequency, F, and the lens coefficient, G. A determination of the relationship between lenticule frequency, F, and lens coefficient, G, as measured in a fabricated lens array configured to have of the a viewing angle, D, of 34 degrees and a lens radius, C, of 4 degrees with a fixed refractive index (for PET), A, and fixed curvature of the container and lens array, E, is shown by line 1120. A median line 1110 is then provided or determined for use in later verifications of the calculated or formula derived values of lenticule frequency. The examples provided in FIGS. 10 and 11 illustrate that for a particular container configuration a lens array can be configured to have an effective lens frequency, F, to achieve desirable results as a number of design parameters are set by the container (such as lens array thickness, B, the refractive index of the container wall and array material, A, and the curvature of the container, E), others can be selected with readily predicted and useful results (such as lens radius, C, and viewing angle, D, combinations), which allows determination of the lenticule frequency, F, based on a known thickness, B, and a known or determinable lens coefficient, G, that is directly related to the frequency, F.

Figure 12:
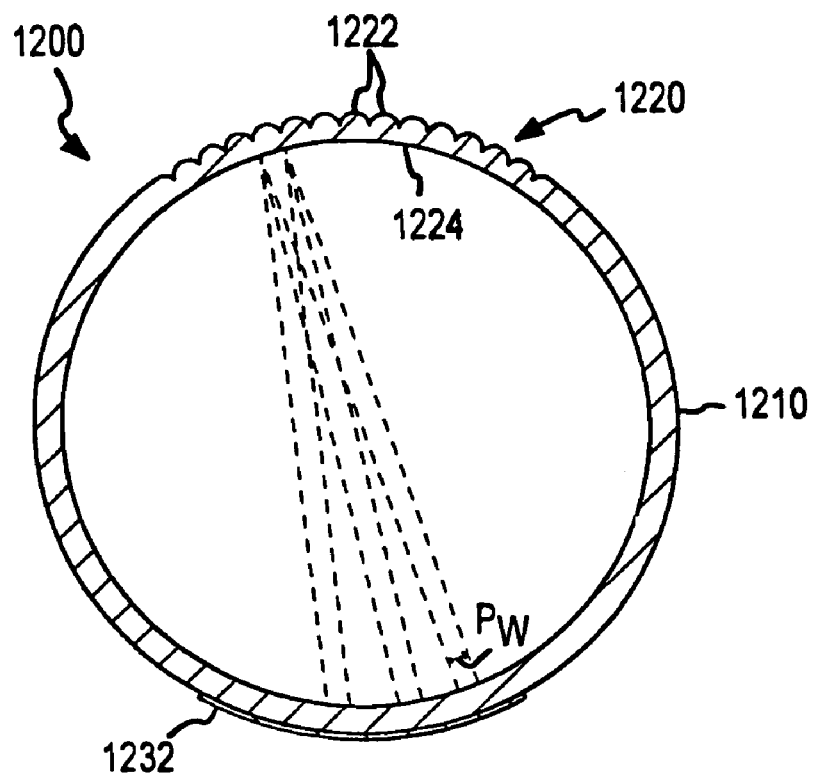
FIG. 12 shows a sectional view similar to FIG. 3 that is enlarged and simplified (e.g., with significantly reduced lenticule frequency) to more clearly shown the use of exterior lenses to achieve effective image coverage in curved containers.

FIG. 12 provides an enlarged cross-sectional view of a container 1200 with an optical system of the invention. As shown, a lenticular lens array 1220 is provided integral with a front portion of the container wall 1210. The lens array 1220 is positioned with lenticules 1222 on an exterior surface of the container 1200 and a "flat" lens layer 1224 positioned on an interior surface of the container 1200. A printed image, such as an interlaced image, 1232 is positioned on an exterior surface of a rear portion of the container wall 1210. The printed image 1232 is mapped to the lenticules 1222 such that particular portions of the data in the image 1232 are matched to one or more of the lenticules or optical ridges 1222. The printed image 1232 may be printed directly on the container wall 1210 or positioned against the exterior surface of the container wall 1210 as part of label attached with adhesives, such as for a label that only covers a portion of the container circumference (such as on soap containers and beer or liquor bottles), or with standard wraparound labeling techniques, such as used with labels that extend about an entire container circumference (such as with bottled water containers).

The lenticules 1222 are shown significantly larger than would be used in practice and at a much lower frequency for to simplify illustration of the effects of container and lens array physical characteristics on the optical effect created by the optical system. A typical embodiment can include lenticules 1222 at a frequency of about 5 to 10 LPI or more with almost a flat lens having a relatively narrow viewing angle, but the specific embodiment may vary based on a number of parameters (such as radius of the container, thickness of the lens 1222, thickness of the container wall 1210, and other physical features). For example, with greater angles of curvature of the exterior surface of the container wall 1210, the mass or thickness of the lenticular lens array 1220 (i.e., thicknesses of lens layer 1224 and lens ridges 1222) may be decreased to achieve a particular graphic result. This results because as the radius is increased in smaller circumference containers 1200 each lens 1222 is not focusing on a flat surface but instead on a convex or inwardly curved surface (i.e., the interior surface of the rear portion of the container wall 1210 adjacent the printed image 1232) as shown by the print width, $P_W$. The print width, $P_W$, is increased on the container wall 1210 due to the convex interior surface that expands the surface area of the general focus of each lenticule 1222, which, in essence, allows a lenticule 1222 to focus more easily over a greater distance (the inner diameter of the container 1200) due to the curvature of the container wall 1210.

Overall, the lenticule frequency or LPI and the lens radius can be decreased as the radius of the container 1200 is decreased (or angle of curvature is increased). Likewise, as the radius of the container 1200 increases (i.e., the distance between the lens array 1220 and the printed image 1232 increases) the lenses 1222 may be more flattened (with smaller lens radii) but still provide effective focusing on the printed image 1232 due to the space (i.e., as measured approximately by the inner diameter of the container 1200). The inner space of the container when combined with the container curvature make it possible to employ a relatively thin, course lens array 1220 to obtain a desired effect. For example, this type of array 1220 can be used to obtain 3D colored patterns.

In one preferred embodiment, the printed image 1232 (and other printed images shown in other figures) can include a first and a second interlaced image. In this embodiment, the lenticular lens array 1220 is mapped to the printed image 1232 such that the first interlaced image is visible when the container 1200 is full of a particular liquid (such as beer, soda, soap, water, and the other translucent or clear liquids) and the second interlaced is visible when the container 1200 is empty (or only filled with air). Such a configuration is obtainable by accounting for the effect of the container contents on light (e.g., the index of refraction and other characteristics of the contents and the distance the light must travel through the contents as measured approximately by the inner diameter of the container 1200). Such a two-image embodiment is useful for facilitating contests in which an initial decorative image is provided by the first interlaced image (or advertises the contest) and an after-use image is provided by the second interlaced image indicating winning and losing containers 1200 (such as with "Try Again" or "WINNER" text or other text and/or images).

Figure 13:
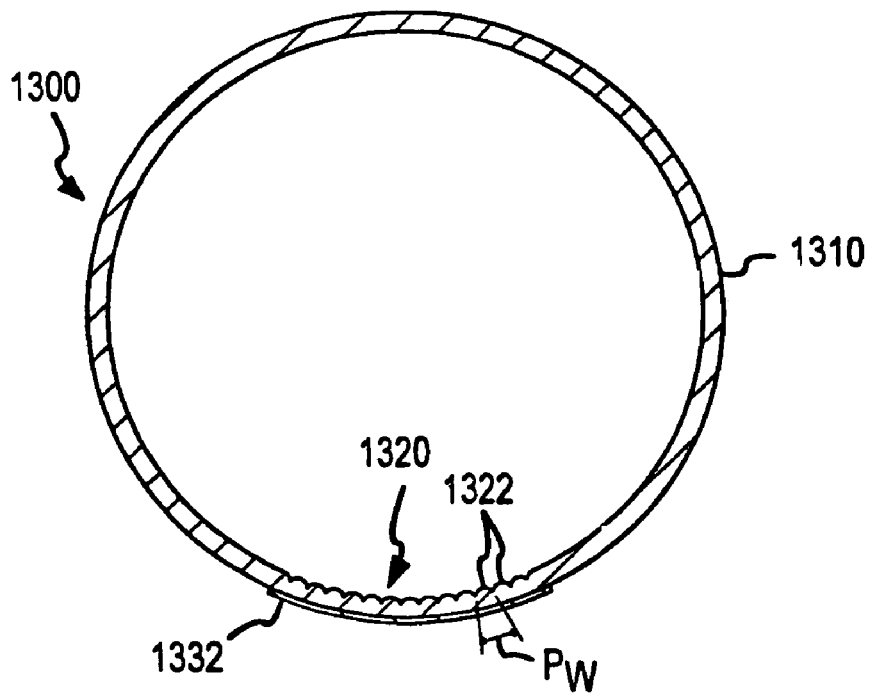
FIG. 13 shows a sectional view similar to FIG. 12 of an inside-the-container embodiment in which the lenticules of the lens array are positioned inside the container to focus on a printed image positioned on an external surface of the wall of the container or printed directly on the exterior surface.

FIG. 13 illustrates a cross section of container 1300 with inside-the-container embodiment of a lenticular lens system (again enlarged with a significantly reduced lenticule frequency than typically would be implemented in practice for ease of illustration of the concepts of the invention). As shown, a lens array 1320 is provided integral with a rear portion of the container wall 1310 with a lenticular surface of optical ridges 1322 positioned contiguous with the interior surface of the container wall 1320. A printed image 1332 is provided, such as with a label (not shown) or with direct printing, on the exterior surface of the container wall 1310 adjacent to and mapped to the lenticules 1322. The curvature of the lens array 1320 (and corresponding container wall 1310) results in each of the lenticules 1322 focusing on the printed image 1332 with a print width, $P_W$, that is larger than would be achieved with a flat lenticular lens sheet.

As with container 1200, the lenticule frequency can be decreased and/or the thickness of the lens array 1320 decreased for containers 1300 with smaller radii (or with lens arrays with greater angles of curvature) but to a lesser degree than container 1200. More importantly, because there is no distance between the lens array 1320 and the printed image 1332, a more direct and known relationship exists between the design or characteristics of the lens array 1320 and a resulting graphic effect. For example, as the curvature of the lens array 1320 increases (inverse relationship to the radius of the container wall 1310), the thickness of the lens array 1320 (or container wall 1310 in embodiments where these thicknesses are approximately equivalent) required for a particular graphical effect is reduced and/or the lenticular frequency can be reduced.

In either of the embodiments shown in FIGS. 12 and 13, it is often useful to adjust label printing or print image pitch or frequency to obtain a desired graphical effect and/or mapping of interlaced image to lenticules in the arrays 1220, 1320. In practice, the printing pitch provided in the printed image 1232, 1332 is adjusted whether provided on an inner surface of a label or whether printed directly on an exterior surface of the container wall 1210, 1310, and such an adjustment during container manufacture has not been performed prior to the use of the lenticular lens systems described herein. The printing pitch adjustments are performed differently for the two configurations of FIGS. 12 and 13. In the exterior lens arrangement of container 1200, as the curvature of the lens array 1220 is increased (such as due to a decreasing radius of container wall 1210) the print width, $P_W$, is decreased or shrunk to match the lenticule placement and shape (assuming a constant lenticule frequency). In contrast, in the interior lens arrangement of container 1300, as the container radius gets smaller and the lens array 1320 gets a greater curvature, the printing width, $P_W$, is increased or made wider to better fill each lenticule 1322 focusing on the printed image 1332.

The effect of contents, such as water or other liquids, will be different in each container 1200, 1300 and should be considered in designing the lenticular lens system for each container 1200, 1300. In container 1200, the addition of a liquid results in a magnification, e.g., a magnification of 1.5 to 3.0 or more for typical containers, that varies with the properties of the liquid and the container size. Hence, the printed image 1232 preferably is engineered for the expected magnification to obtain a desired graphical effect by ensuring the data strips of the printed image 1232 line up or are mapped to the lens ridges 1222 with proper dimensions, which is especially important in embodiments of the printed image 1232 which contain a first and a second interlaced image with the first image visible in the presence of the magnification and the second image exclusively visible in the absences of such magnification. In container 1300, the addition of the liquid magnifies the image in a one-way fashion from the rear portion of the container wall 1310 to the front portion of the container wall 1310. The magnification effect is lessened but still needs to be taken into account in engineering the printed image 1332 to obtain a desired graphical effect. In the container 1300, the created graphical image will basically be the same in the presence and absence of the liquid but will be magnified or enlarged in the presence of the liquid. Hence, in some embodiments, the printed image 1332 is configured such that the created graphical image is sized based on the front portion of the container wall 1310. For example, in some embodiments, the printed image 1332 is configured to fill all or some portion of the front portion of the container wall 1310 with a graphical image or effect when the container 1300 is filled with liquid and magnification is taking place and to fill a reduced portion of the front portion of the container wall 1310 when the liquid is removed from the container 1300.

Figure 14:
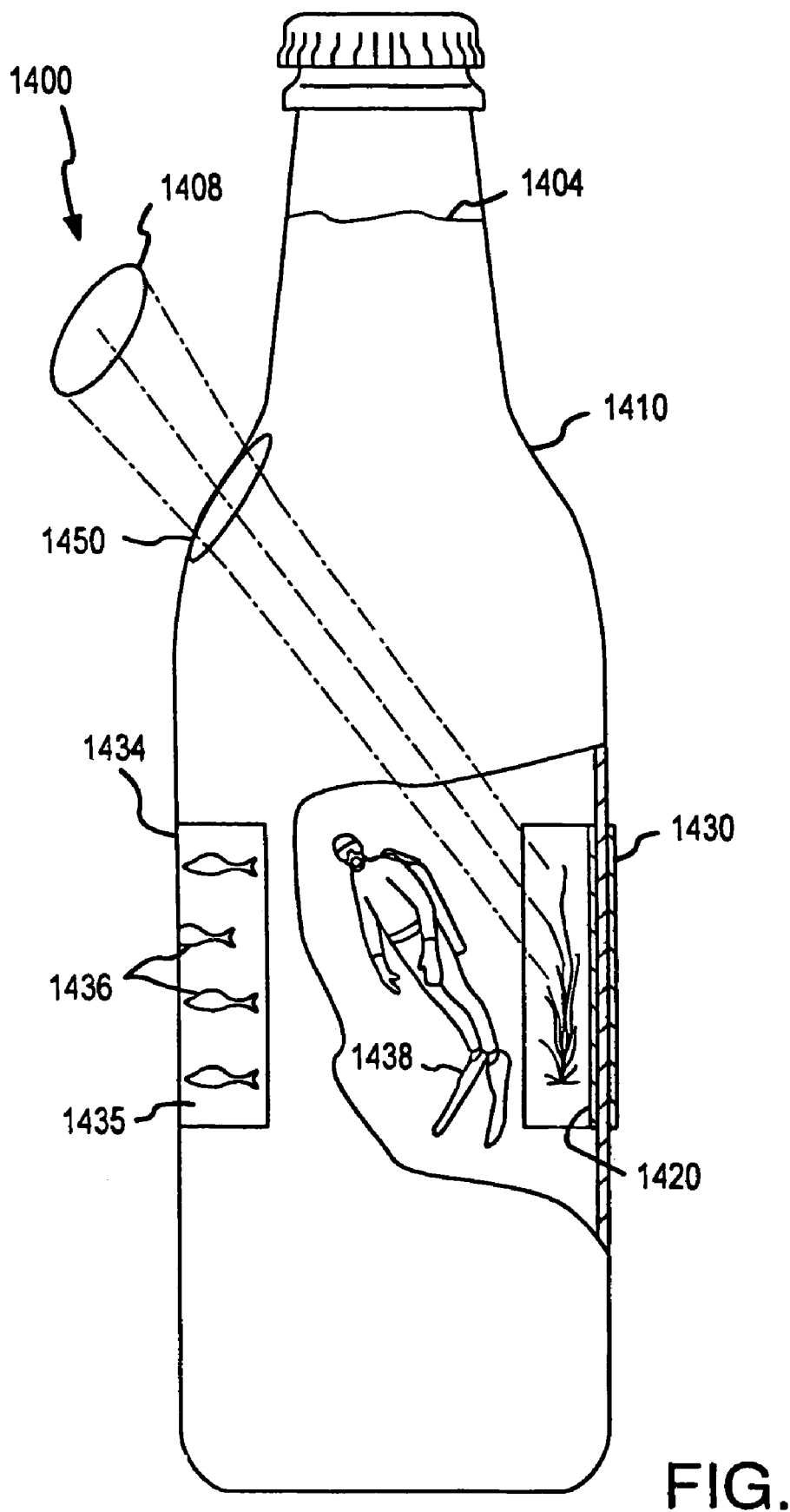
FIG. 14 illustrates yet another lenticular lens system in a container (such as a clear glass bottle, e.g., a beer bottle and the like) in which the lenticules of the lens array are positioned inside the container, a light focusing lens is provided to direct light toward the lenticules and/or the printed image behind the lenticules, and an additional printed image is provided on the front portion of the container to provide forefront images or objects to enhance the 3D or other image effects obtained by the lens system.
Figure 15:
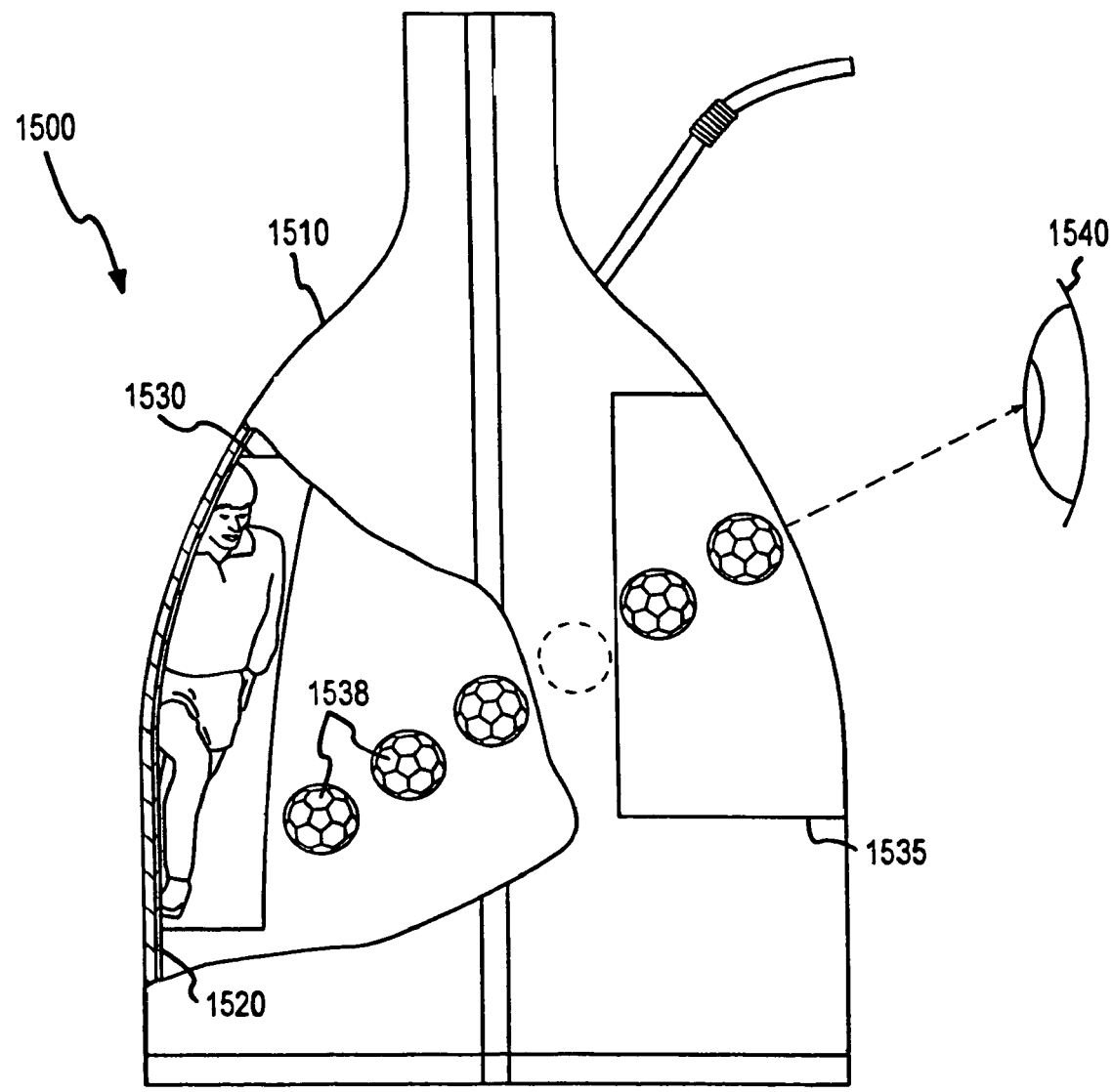
FIG. 15 illustrates a flexible beverage container (such as common juice pouches or bags) with a partial cutaway to show that a lenticular lens system is provided in the container that provides a clear front window to allow light into the container and to provide a line of sight to a lens array with lenticules positioned inside the container with a printed image provided on the inside or interior wall of the container (typically, fabricated from a metallic material)

The number of specific arrangements of containers with lenticular lens systems having features of the invention (such as a lenticular lens array integral with a container wall) are expected to be very large and readily apparent to those skilled in the art who have read and understood the description of the invention and these numerous arrangements are believed to be within the scope of the invention. FIGS. 14 and 15 provide two more exemplary embodiments of containers with lens systems of the invention.

In FIG. 14, a container 1400 such as a glass or plastic beer or other beverage bottle is shown with a container wall 1410 retaining liquid 1404. A printed image 1430 is provided on the exterior surface of a rear portion of the container wall 1410. As shown, a lens array 1420 is provided on the interior surface of the rear portion of the container wall 1410 adjacent the printed image 1430. In the container 1400, the lens array 1420 has a thickness greater than the adjacent container wall 1410. In some embodiments of the lens systems or containers of the invention, the lenticules or optical ridges are fabricated or molded by providing additional material at the location of the lens array 1420. For example, the "flat" lens layer of the lens array 1420 may have a thickness substantially equivalent to the container wall 1410 and the additional material may be provided for the lenses such that the thickness of the lens array is the container wall thickness plus the thickness or radius of the optical ridges.

The lens system of container 1400 further includes a light-collecting lens 1450 for collecting and/or directing light rays 1408 toward the lenticular lens array 1420 and/or the printed image 1430. A "floating" graphical image 1438 is produced with 3D effects produced by the combination of the lens array 1420, the printed image 1430 and collecting lens 1450. To enhance the 3D or graphical effect achieved, the lens system of container 1400 includes a frontal image element 1434 (such as a label or printing directly on the container wall 1410) on the exterior surface of a front portion of the container wall 1410. The frontal image element 1434 includes forefront images 1436 and a transparent portion 1435 (in embodiments of direct printing the transparent portion can be eliminated). The forefront images 1436 enhance the 3D effect by providing images viewable at the outer surface of the container wall 14210 that when combined with the projected 3D image 1438 and the background images on the printed image 1430 produce a multilayered graphical effect.

FIG. 15 illustrates another useful container 1500 in which a lens system of the invention can be incorporated to produce an image to a viewer 1540, such as an image with 3D and motion like a soccer player kicking a ball 1538 that moves through the container 1500 toward the viewer 1540. The container 1500 may be a flexible beverage container, such as those used for distributing juice beverages, with flexible or compressible container walls 1510 that are typically metallic and opaque. A clear window 1535 (such as a transparent or translucent plastic element) is provided in a front portion of wall 1510 to allow light to enter the container 1500 and provide a line of sight to the viewer 1540. The cutaway view shows that the lens system includes a printed image 1530 provided on the interior surface of the rear portion of the container wall 1510. Adjacent to and mapped to the printed image 1530 is a lenticular lens array 1520. In this embodiment, as opposed to those described in FIGS. 1-14, additional (and often differing) material is provided and attached to the wall 1510 rather than being provided integrally with the container wall 1510. Because the container walls 1510 are not blow or injection molded typically the temperatures occurring during manufacture are low enough to not be a concern in damaging the ink in the printed image 1530 or in damaging the lenticules in the lens array 1520, which can be attached with standard adhesives and practices.

While forming a lenticular lens array integral with a container wall provides many advantages, containers can be produced with other configurations to provide excellent quality images with non-integral lenticular lens arrays. The following paragraphs explain some of these differing designs for containers and for lenticular lens systems with reference to FIGS. 16-27. One such method involves forming a lens or lens array on a container by using a clear plastic in the form of a wrap or decal to form the top of the lens array. This structure could readily be formed on a decal or wrap surface by embossing or extruding the shape of the top of the lens (i.e., shaping the lenticules). Such wrap around and decal methods are very desirable from a cost and tooling point of view, as they allow application of a bottle wrap or decal on an already tooled container, e.g., a typical bottle or other often used glass or clear plastic container.

Interestingly, the lens top or the lenticular lens array in the label or decal would be relatively useless and not designed properly for application directly onto an interlaced printed piece if it were not for the thickness of the container and its walls and the mathematic that allows the formation of the lens array and the focal point designed for the particular container. In other words, the thickness of the decal or clear embossed wrap becomes part of the container wall and together these structures form a lens system that is effective in focusing on a focal point near a printed image provided on the container, such as on the wrap around label in a portion opposite the lens array or on the exterior or interior surface of the container wall (or even as an integral portion of the container wall).

Figure 16:
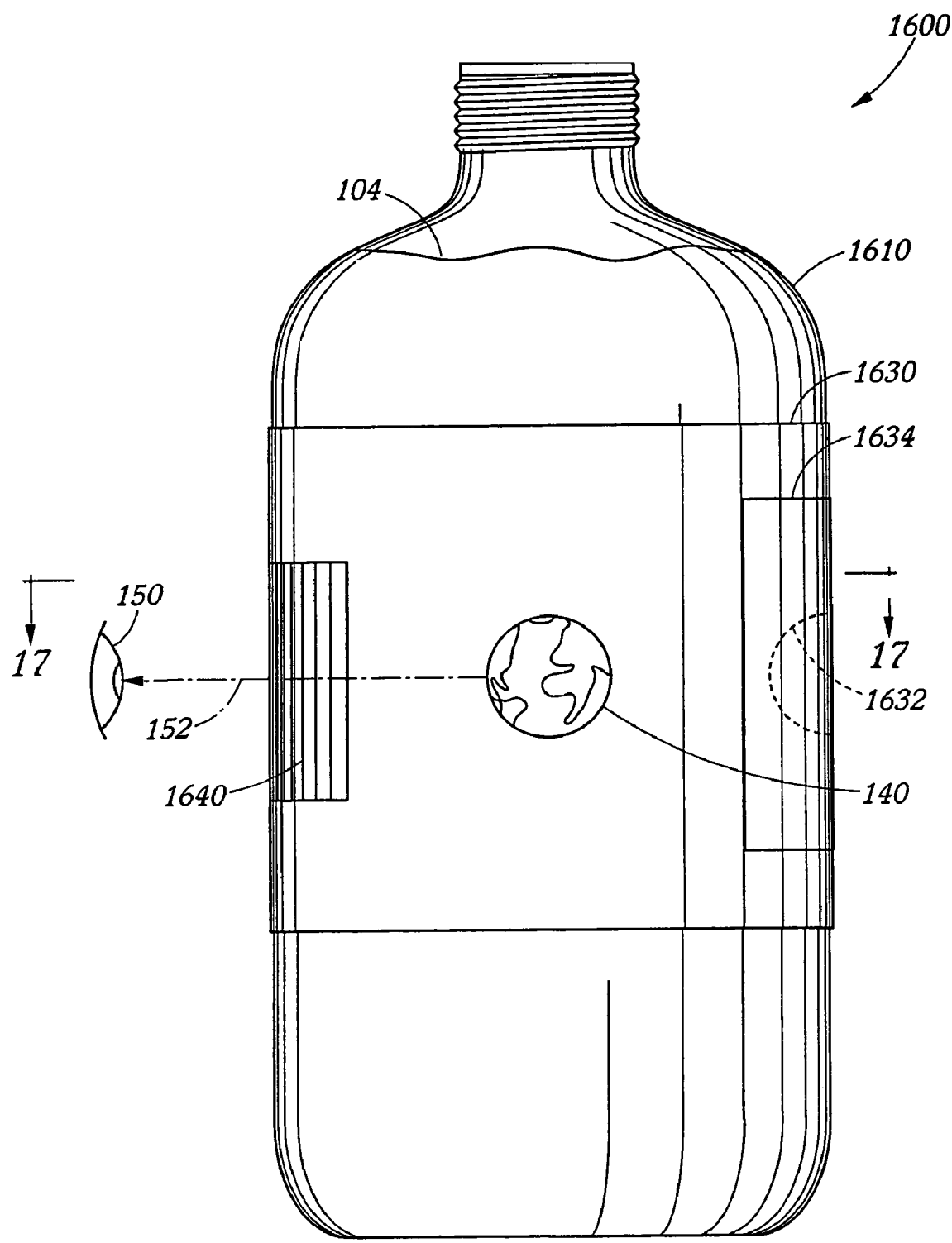
FIG. 16 is a side view similar to FIG. 2 illustrating another embodiment of a container according to the invention with a wrap around label with an integral lenticular lens array formed in a first portion on the exterior surface of the label with a printed image in a second portion of the label.
Figure 17:
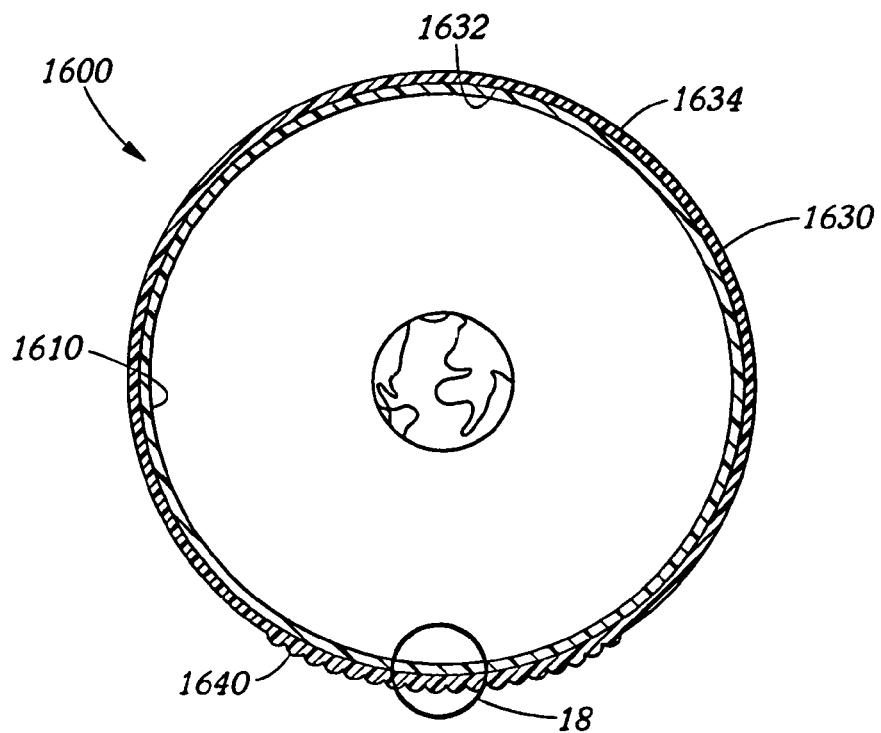
FIG. 17 is a sectional view of the container of FIG. 16 illustrating that the printed image is positioned opposite the lenticular lens array such that the container walls and any liquid in the container form the lens system.
Figure 18:
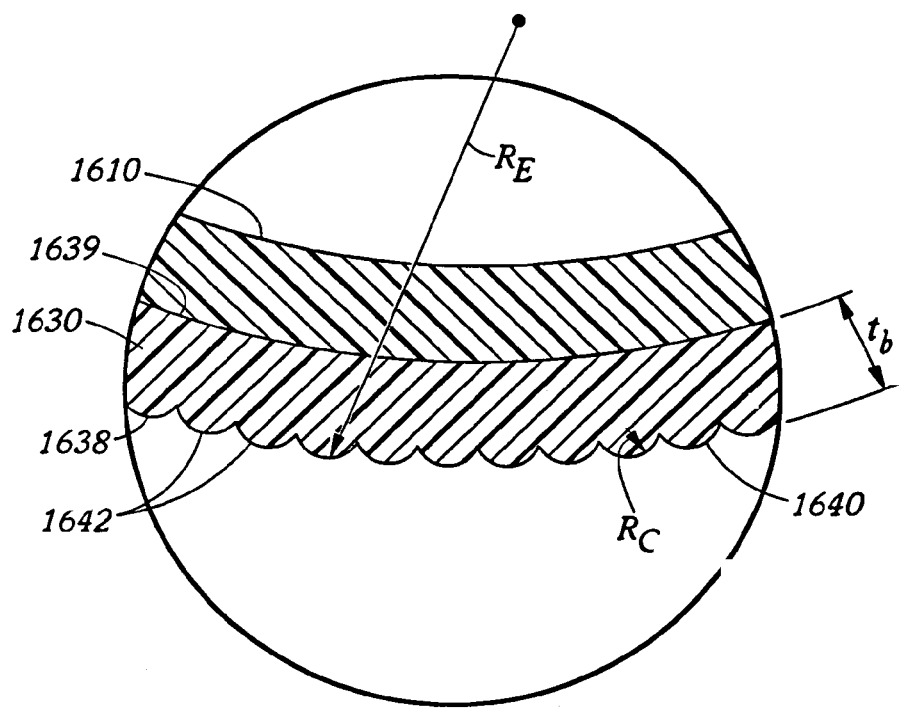
FIG. 18 is an enlarged view of part of the sectional view of FIG. 17 illustrating in more detail the lenticular lens array formed integrally with the wrap around label.

FIGS. 16-18 illustrate a container 1600 utilizing a lenticular lens system of the present invention to produce a floating image 140 visible to a viewer 150 using exemplary sight line 152. As shown, the container 1600 is provided with a standard shape, such as those used for water and other similar bottles, but the invention is broad enough to cover nearly any shape for which a wraparound label may be provided. The container 1600 includes clear or translucent walls 1610 for containing contents, such as a liquid, 104. The container wall 1610 is typically formed of glass or, more typically, of a plastic such as polyvinyl chloride (PVC), polypropylene, polyethylene, polyester (such as PET, APET, PETG, and the like), or any other plastic useful in the packaging industry.

In contrast to the container 100 of FIG. 1, the container 1600 does not include a lenticular lens array integral with the container wall but instead a lenticular lens array 1640 is provided as an integral portion of a wrap around label 1630. As shown, the lenticular lens array 1640 is configured with numerous lenticules or lenses 1642 of ridges or ribs formed in an exterior surface 1634 of the label 1630. The lenticules 1642 extend parallel to each other and, typically, to a longitudinal axis of the container 1600. As with the container 100, the lenticules 1642 of the lens array 1640 are configured in frequency (lenticules per inch) and shape (such as width and radius) based on the material of the container wall 1610 (and array 1640), based on the liquid contents 104 of the container 1600, and the curvature of the container wall 1610 to focus on the rear portion of the container wall 1610. The space or distance (i.e., the inner diameter of the container) allows a coarser configuration for lens array 1640 to be used while still providing a large quantity of data in the printed image 1632. The lenticular lens array 1640 can have a wide variety of dimensions (such as a height and "width") selected based on the size of the container 1600 and the size of the printed image 1632 and shapes (such as a square, a rectangular, a triangle, a circle, an oval, or any other useful shape for viewing the image 1632).

With lenticular lens array 1640 focusing on the rear portion of the container wall 1610, a graphical image 140 can be produced within the container 1600 so as to "float" in the liquid 104 or elsewhere by providing a printed image 1632 at the focal point of the lens structure or system. The label 1630 is fabricated from a clear or translucent material, such as a plastic, so as to not interfere with light passing through the lens array 1620. The wrap label 1630 together with the container walls 1610 (front and back in this embodiment) combine—along with the liquid 104 in some cases—to form the lens structure or system that generates the image 140.

The label 1630 includes a data area or backdrop portion 1634 in which a printed image 1632 is provided on an interior side or surface of the label 1630. When the label 1630 is placed on the container 1600, such as by heat shrinking or other application techniques well-known in the packaging arts, the printed image 1632 is positioned relative to the rear portion of the container 1600 (e.g., at the focal point of the lenticular lens array 1640, container walls 1610, and, if present, liquid 104) to map or register the interlaced printed image 1632 with corresponding lenticules 1642 or portions of the lenticular lens array 1640. As discussed previously, the image 1632 may be printed using known techniques for printing images or data to achieve graphics, such as 3D, animation, or action, and for use with lenticular lenses or lenticular materials. As with the container 100, the mathematics used for designing and printing the image 1632 are preferably not only selected to match the lens material and configuration in the label 1630 but also the distortion caused by the curvature of the container wall 1610 and array 1640 and of the liquid 104 in the container 1600.

FIGS. 17 and 18 more clearly show the construction of the wrap around label 1630 with the integral lens array 1640 and the fabrication of the container 1600. As shown, the label 1630 has an exterior or first surface 1638 and an interior or second surface 1639 opposite the first surface 1638. The lenticular lens array 1640 is formed on a portion of the exterior or first surface 1638 with a plurality of lenticules 1642 which are formed of valleys extending into the label thickness and ridges extending out from the label 1630. The lens array 1640 has a flat surface on the interior or second surface of the label 1630 that abuts the exterior surface of the container wall 1610. The label 1610 further includes the data area 1634 which includes the printed image 1632, which may be on the interior surface 1639 of the label 1630 as shown or on the exterior surface 1638 of the label 1630. Further, in some embodiments not shown, the printed image 1632 is printed directly onto the container wall 1610 on an interior or exterior surface so as to be positioned at the focal point of the lens array 1640.

Typically, the label 1630 is fabricated from a very thin sheet of clear plastic to minimize distortion through the array 1640. The lenticular lens array 1640 includes a plurality of optical ridges or lenses 1622 (extending vertically as shown or horizontally) and a transparent lens layer or web abutting the container 1610. Fabrication of such lens arrays (including using mathematical formulas of the invention in the design processes) is explained in detail with reference to FIGS. 10 and 11. Here it is useful again to understand that the array 1640 has a thickness, $t_b$, that affects focusing of the array 1640 and typically is substantially equivalent to a thickness of the label 1630 (although in some cases the array 1640 may be slightly thicker or thinner to provide a desired optical effect and/or provide a desired structural strength). Optical results of the array 1640 are also determined by other physical characteristics of the array 1640 including the material of the array 1640 and label 1630, the material of wall 1610, the frequency of the lenticules or ridges 1642 (typically measured in lenticules per inch (LPI)), the curvature of the array 1640 as determined by the curvature, $R_E$, of the container wall 1610, and the radius (or width) of the lenticules or lens, $R_C$, and the relationships between these characteristics or design parameters. Additionally, the resulting optical effect is determined in part by the liquid 104 (or lack of liquid) in the container 1600 and the distance from the lens array 1640 to the rear portion of the container wall 1610 (and the printed image 1632) which is approximately the inner diameter of the container 1600 at the location of the array 1640 and the printed image 1632.

A number of techniques can be used to produce the label 1630 and container 1600 including the label 1630. For example, a clear label wrap 1630 in some embodiments is used that is printed and embossed in line (or in separate processes) as with the lens array 1640 (embossing) and the printed material of data area 1634 and printed image 1632. The wraps currently used for bottled water, for instance, are printed and embossed in line and then "shrink wrapped" in their normal process around the bottle. In one case, the same printing press that prints the flexography inks is used to emboss the top of the lens array into the plastic using a heated or unheated pressure roller. In another case, the lenses or lenticules of the lens array 1640 applied in spots of the roll and only in the desired locations of each label 1630.

An important feature of the embossing or array fabrication technique is the calculation of the focal point of the lens array 1640 of the label 1630 in combination with the container wall(s) 1610 and the distortion created in the process of shrinking or applying the wrap 1630 to the container 1610 so that the printing matches the lens 1642 in the process. Additionally, the label 1630 must be designed and fabricated for a particular diameter container 1600 such that lens array 1640 lines up in the wrap application (or wrapped/applied condition) correctly to the printing on the wrap label 1630 when applied to the container wall 1610. The whole process can be done in line on the same equipment currently used for printing and applying the labels with an embossing station. This particular method would not only be efficient, but it would also be commercially feasible within a short period of time. The additional tooling would be minimal, and the wrap label 1630 can be adjusted in line and would involve only one process for application and quality control. In line operators adjust the printing and the lens application at the same time in the process. There would not be any additional cost in the manufacturing process except the die cost for the lens embossing station. Another embodiment involves obtaining the plastic label (this is commonly polypropylene) embossed or spot embossed or extruded (or performing these operations separately) prior to the printing of the wrap label 1630.

Figure 19:
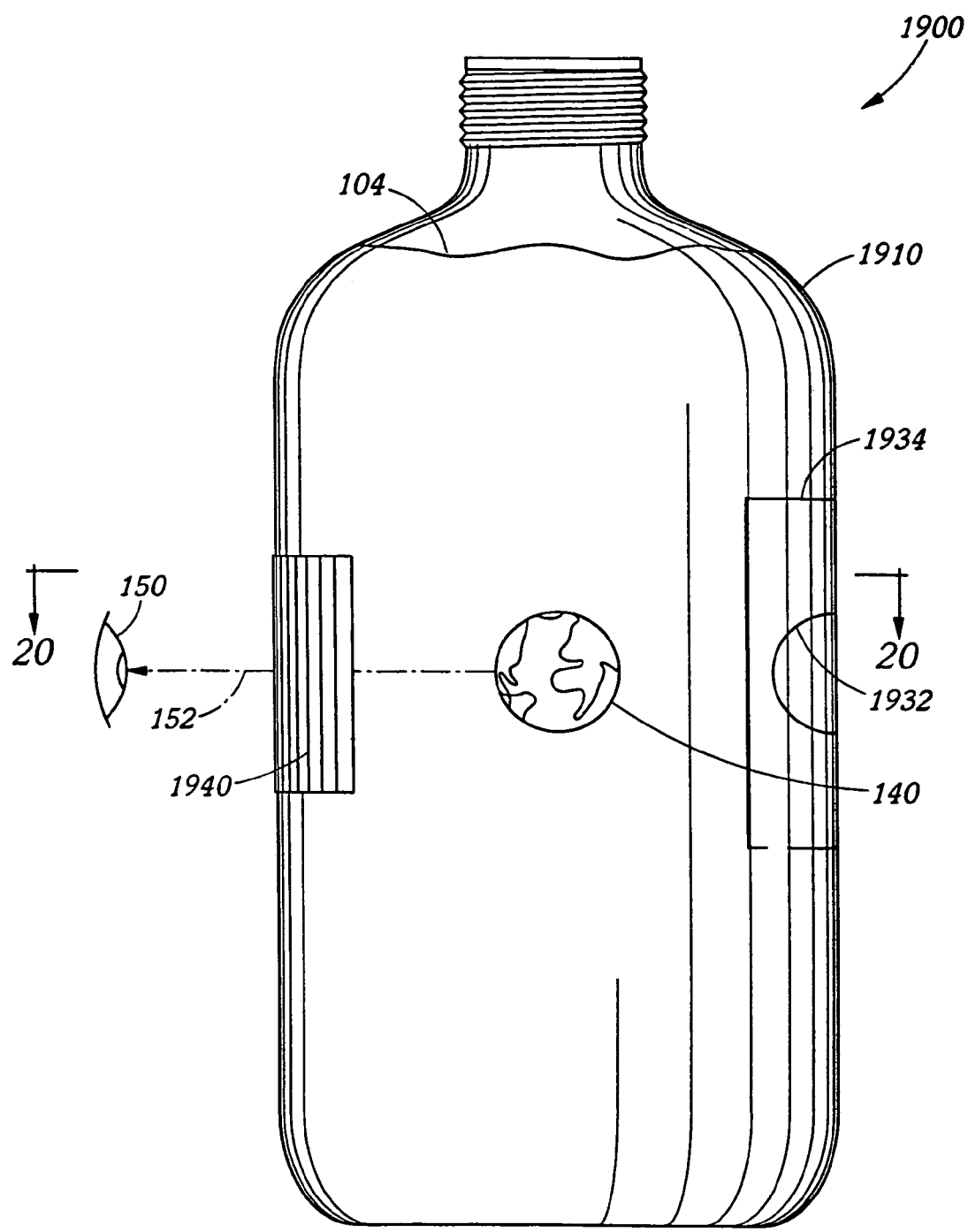
FIG. 19 is a side view similar illustrating yet another embodiment of a container that includes a lens system according to the invention that utilizes a lenticular lens decal combined with a transparent container to focus on an image printed directed on or within the container wall.
Figure 20:
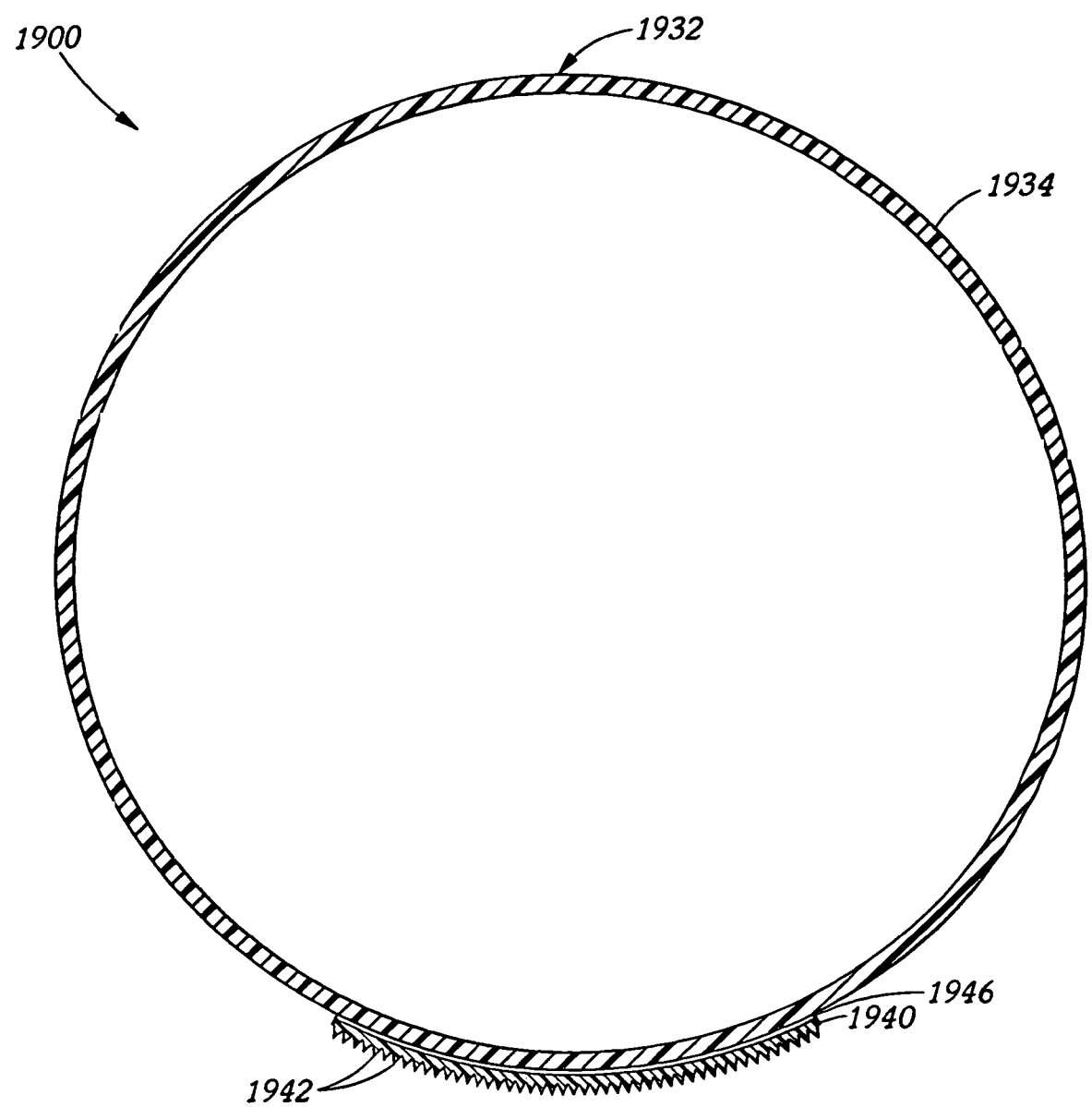
FIG. 20 is a sectional view of the container of FIG. 19.

FIGS. 19 and 20 illustrate another embodiment of a container 1900 according to the invention. As shown, the container 1900 differs from container 1600 in that a wrap around label is not used to provide and position a lens array and the printed image. Instead, the container 1900 includes container wall 1910 with a data area 1934 that is formed directly upon the container wall 1910. As shown, a printed image 1932 is printed upon an outer surface of the container wall 1910 in the data area 1934. Significantly, a lenticular lens array 1940 is provided in the form of a decal (i.e., an element that does not extend completely about the circumference of the container 1600). The array 1940 is positioned on the exterior surface of the container wall so as to be substantially opposite the data area 1934 and printed image 1932 (or such that the printed image is at the focal point of the lens array 1940).

As shown, the lenticular lens array 1940 includes a plurality of lenticules 1942 (such as or similar to the lenticules 1642 of array 1640 in FIG. 16) on its exterior surface, i.e., distal to the container wall 1910. A flat surface of the array 1940 is adjacent or proximal the container wall 1910, and the array 1940 is affixed to the container using an adhesive applied at the interface 1946 (or the array 1940 could be said to include an adhesive layer). The lenticular lens array 1940 is configured with lenticules 1942 having a frequency and other design characteristics (discussed above) such that the focal point of the lens system is at or about the printed image 1932, i.e., in this case, at the exterior surface of the container wall 1910 opposite the lens array 1940. In other embodiments, the printed image 1932 may be positioned on the inner surface of the container wall 1910 opposite the array 1940, and in these embodiments, the focal point would preferably be at or near the interior surface of the rear container wall 1910. The configuration of the lens array 1940 should take into account the thickness, shape, and materials of the lens array 1940, the adhesive 1946, the container walls 1910 (front and back), and any contents of the container 1900.

To form the container 1900, one method of application is for the thin lens array 1940 to have a hot melt glue, pressure sensitive adhesive, static electricity or any other method of application that allows the label 1940 to stay in place on the container wall 1910. This may be considered a "decal" lens array application method. The decal 1940 in one embodiment is made out of a clear, pressure sensitive material and is embossed or extruded in rolls to form the lenticules 1942, typically prior to the application of the adhesive 1946. In some preferred embodiments, the lenticules 1942 are embossed onto a base material of the array 1940 having a thickness from about one mil to about twenty or more mils and then, the lens array 1940 is applied to the container 1900. The container wall 1910 and the thickness of the material (including the adhesive) would be calculated in combination to create the focal point of the lens array 1940. The application of the lens array 1910 onto the container 1900 would preferably be straight and consistent so that the application of the printed label (in some embodiments) or the printing to the data area 1934 with printed image 1932 (as shown) is aligned consistently regardless of whether printing occurs before or after application of the array 1940. In some cases, the decal arrays 1940 are embossed in sheets to form the lenticules 1942 with a desired configuration or in rolls and are then converted into die cut pieces in line prior to or in conjunction with their application coming off the line. The lens array 1940 is formed of a clear plastic and in one particular embodiment is formed out of UV curable acrylic (or some other polymer).

The lens system shown for container 1600, 1900 is applied to glass containers in some embodiments of the invention. The label lens is applied over the glass bottle or container forming the top of the lens array. The thickness of this lens piece is combined with the container wall to equal the focal point of the particular container. In these embodiments, the label lens is sometimes made out of thin glass and applied to the glass container wall. These embodiments preferably address the fact that blown glass lens arrays are difficult to keep consistent in the process. Hence, in the described glass embodiments, glass or acrylic is molded, injection molded, or otherwise processed to form a flat or curved piece that is applied to the container with glue, heat, pressure, and the like. In this manner, glass containers according to the invention facilitate the formation of a perfect (or near perfect) lens that is applied to the container (such as container 1600 and 1900).

Figure 21:
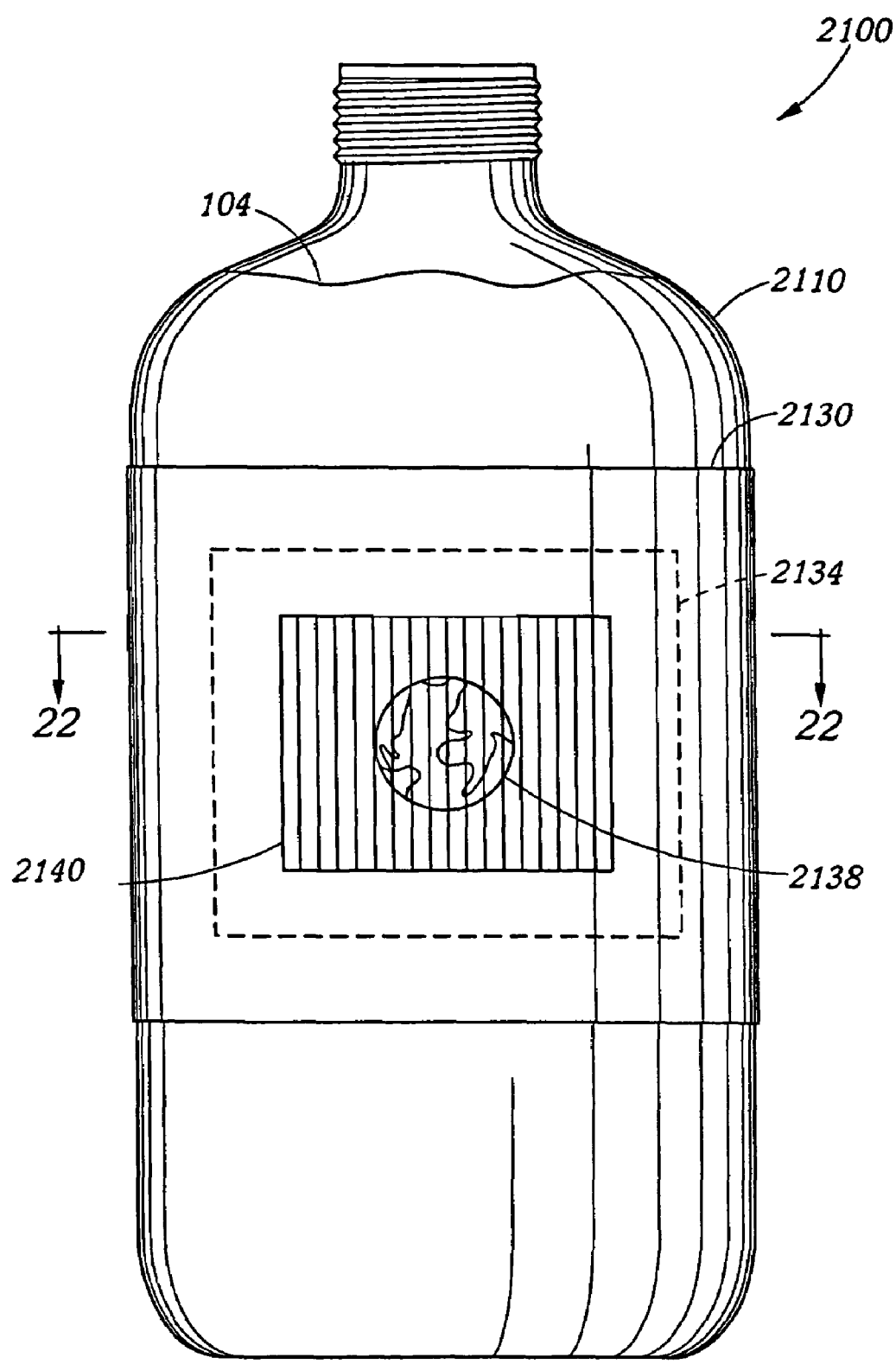
FIG. 21 is a front view of a container according to another embodiment of the invention utilizing a wrap around label with an integral lenticular lens array and a printed image provided on the label adjacent the lens array on the opposite side of the label.
Figure 22:
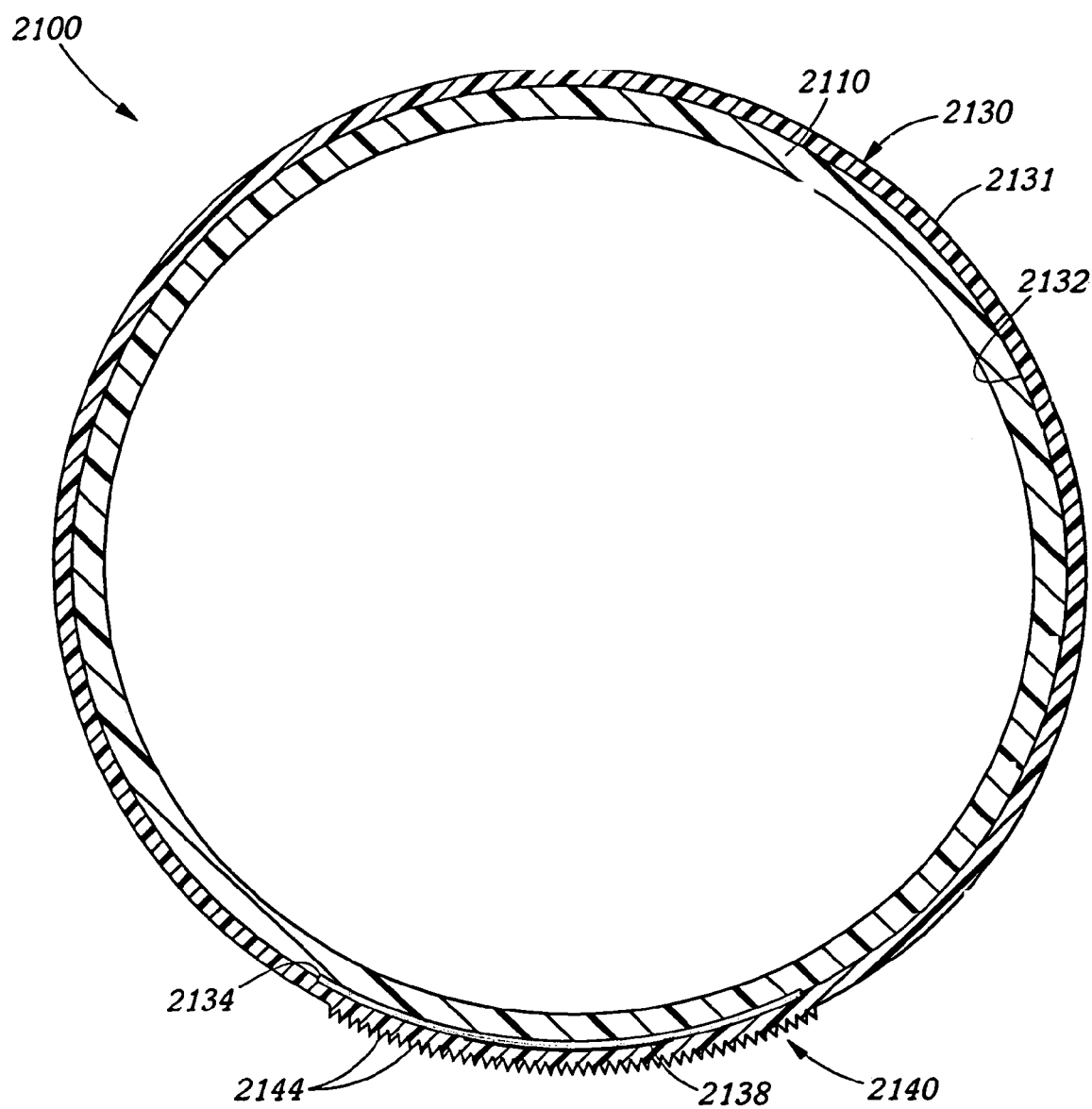
FIG. 22 is a sectional view of the container of FIG. 21.

FIGS. 21 and 22 illustrate a container 2100 according to an embodiment of the invention that requires no modification of the container walls 2110. The image and the lenses are both provided as part of a wrap around label 2130. The label 2130 is applied to the container walls 2110, such as with heat shrinking and little or no adhesive. The label 2130 is formed of a clear material, such as plastic, and as with the label 1630 of FIG. 16 it is relatively thin. The label 2130 includes a lenticular lens array 2140 that is typically but not necessarily formed by embossing the outer surface 2131 of the label 2130 to form a plurality of lenticules 2144. When the label 2130 is applied to the container wall 2110, the lenticules 2144 are distal to the container wall 2110.

The label 2130 further includes an inner or second surface 2132 that abuts the container wall 2110 when the label 2110 is attached to the container wall 2110. On the inner surface 2132 adjacent the lenticular lens array 2140, a data area 2134 is provided (and may take any of the forms discussed above). In the data area 2134, a printed image 2138 is provided, such as with any of the printing methods described herein. In other embodiments (not shown), the image may be provided on the container wall 2110. In the container 2100, the lens structure has a much smaller overall thickness and the focal point is very near the lens array 2140 than in the containers 1600 and 1900 and hence, it may be appropriate to include a smaller quantity of data in the image 2138. The thickness of the wrap around label provides the thickness of the lens system, and this thickness includes the lenticules 2144 and the flat web portion of the array 2140 behind or between the lenticules 2144 and the image 2138. The focal point of the lens array 2140 is at or near the back of the label 2130 (i.e., interior label surface 2132) or at the exterior surface of the container wall 2110. Manufacture of the container 2100 is simplified as the image 2138 and lens array 2140 are mapped as part of the fabrication of the label 2130 and the label 2130 can be applied to the container wall 2110 without concern for registering of the lens array 2140 with the image 2140.

Regarding the embodiments of FIGS. 16-22, it may be useful to provide a number of exemplary (but not limiting) design characteristics useful in creating containers with desirable visual effects. The wrap around label or decal thickness used to provide the lens array (and often the printed image) in several preferred embodiments is kept in the range of about 2 to about 16 mils and more preferably between 3 and 15 mils.

For a wrap around label that has printing (i.e., the printed image) directly on the reverse or interior side (i.e., directly behind the portion of the label that contains the lens array), embossing of the lenticules on the exterior surface of the label is used in one embodiment. The printing and embossing may be completed concurrently or serially during the manufacturing process, and the LPI may range significantly to practice the invention. For example, thicker wraps having a thickness of about 14 to about 16 mils may utilize a lenticule frequency of 80 LPI while thinner wraps (e.g., more common thickness for labels) having a thickness up to about 8 mils or larger may use a larger lenticule frequency of about 140 to about 200 LPI.

Container embodiments that utilize a lens system including the thickness of the container wall(s), any contents of the container, and also the thickness of the wrap around label (or decal) to focus at the back of the container have frequencies of about 8 to about 30 LPI. The frequency preferably varies to support selected viewing angles, design of the lens, and the particular image (e.g., 3D, motion, or the like). In these embodiments, the wrap or label (or decal) is typically between about 2 to 8 mils, with thinner labels being utilized since surface embossing or other techniques for providing the lenticules is combined with the thickness of the container to form the lens structure or lens system.

As a result, the combination of the lens array in the label and the container wall thickness with the distance to the focal point (i.e., the diameter or distance from a front wall to a rear wall of the container) and the curvature of the container (in some cases combined with the magnification caused by the contents of the container) produce a very powerful lens structure or system, even with a relatively think label. In general, the thickness of plastic container walls is about 12 to 20 mils, which would be combined with the label or wrap thickness of about 6 to 8 mils in one embodiment. The coarseness or low lenticule frequency in this embodiment makes the printing of the image or data area more forgiving as the data space in a, for example, 20 LPI lens array is much more forgiving and wider than a higher frequency or less course lens array. Hence, label printing according to the invention is easier and less error prone.

As will be appreciated by those in the label manufacturing industry, a number of techniques can be used to create the wrap around labels (and also the decals and inserts) of the invention so as to provide lenticules or a lens array and, at least for some embodiments, a printed image in a data area. For example, but not as a limitation, the labels may be produced by embossing the lens array or lenticules on the label. The embossing is performed as the label material is extruded using a typical extruder of plastic, e.g., an extruder that utilizes heated rollers and/or an oven to heat and shape the material to a desired thickness. In one case, a chill roller is used to emboss the heated, extruded plastic (alone or in combination with a pressure roller) and then, chill the label material so as to form the lenticules across entire width of the material or in a section of the material (i.e., in the lens array shown in FIGS. 16-22). This technique may be labeled "off line embossing." Printing may occur before or after the embossing (or in some cases, even during embossing, and then, the material is wound for distribution and/or further processed for application as labels (such as by die cutting prior to application to a container). Typical materials used in this manufacturing technique are OPP, polyester, PVC, polyethylene, and the like. Temperatures of the extruded plastic are typically between about 400 and 700° F.

Another technique for creating a lens array is to form the lenticules during the flexographic or letterpress printing of the labels or wraps. In this embodiment, a heated embossing station is added to the press assembly so that the label material is heated to over about 300° F. and then, embossed with an engraved or etched embossing plate or roller between two cylinders, typically at higher pressures. The heat may be applied to the label material or to the roller (or both) during this process. In some cases, it is advantageous to heat the material prior to the embossing stations and then, use the embossing station to cool the label material to a reduced temperature while embossing using a chilled roller (as is done in extrusion). In one version of this technique, the press is used as just the embosser with printing being performed in a separate process.

In another label manufacturing process, embossing of the lens array or lenticules of the lens system is performed using a flat letterpress embossing die. The die is applied typically while running the label material between a cylinder and the embossing die. The cylinder or roller typically moves back and forth over the length of the stationary die (and, at least temporarily, stationary label material) and the embossed material is then advanced, thereby positioning another portion of the non-embossed label material to the die. In one particular embodiment, a Heidelberg cylinder letterpress is used to form the label including the lens array. In other embodiments, the lens structures are formed in the label material with other techniques such as with UV beams, E beam liquid, and the like using flexo plates that are either mechanically engraved or engraved through exposure. Of course, the embossed label material or material with the formed lens arrays may then be rewound before or after printing of the printed images (e.g., to provide a roll to roll embossing operation).

FIGS. 23-27 illustrate embodiments of the invention that can be formed in plastic containers or, more typically, in glass containers. Each of these embodiments involves the use of a lenticular lens insert or array that is inserted into a recessed surface or indentation on the container, such as on a container wall. Hence, in the embodiments of FIGS. 23-27, the containers are blown or otherwise formed to include a recessed surface or indentation for receiving a lens insert that becomes a substantially integral part of the container wall and focuses a viewer's line of sight upon a focal point on or near the container wall that coincides with the placement of a printed image. The lens insert in these embodiments often will be substantially flat or planar, which simplifies manufacture and achieving a desired visual effect, but in some cases, has a curvature to match the surrounding container wall.

Figure 23:
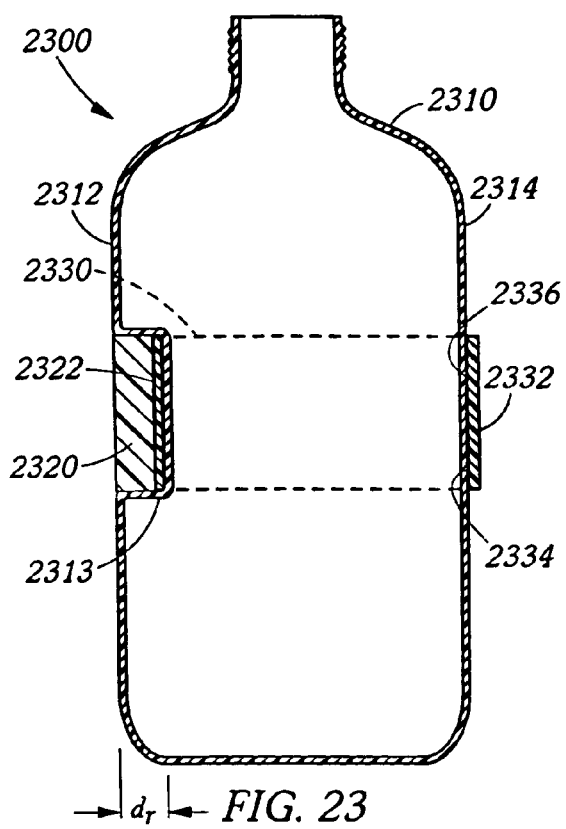
FIG. 23 is a sectional view of another container according to the present invention showing a lenticular structure or system including a wrap around label positioned within a recessed surface or indentation in a side of the container and a lenticular lens element inserted into the indentation to cover the label and so as to focus the lens through the container walls.

In FIG. 23, a container 2300 is shown with a container wall 2310 defining an interior void for containing a liquid or similar material. The container wall 2310 includes a first or front portion 2312 and a second or rear portion 2314. The front portion 2312 includes a recessed surface or indentation 2313 with a depth, $d_r$. The shape of the indentation 2313 and the depth, $d_r$, are selected for receiving a label 2330 that is wrapped around the container wall 2310. The indentation 2313 further receives and positions (relative to the container wall 2310 and label 2330) a lens array or insert 2320, which comprises a plurality of lenticules on a first side and a flat surface or web layer on a second side. The lens insert 2320 is either snapped or mechanically affixed onto the front container wall or portion 2312 to be held in place or is attached (as shown) with a layer of adhesive 2322 that bonds to the label 2330 (and, typically, a portion of the wall 2310 or indentation 2313 adjacent the label). The adhesive layer 2322 is selected to be substantially clear or transparent and to be chemically compatible with the material of the label 2330.

The lenticules of the lens insert 2320 are positioned distal to the label 2330 and container portion 2312. In preferred embodiments, the thickness of the etched insert 2320, adhesive layer 2322, and label 2330 are selected to be equal to or to be about the depth, $d_r$, of the indentation 2313 such that the lenticules of the insert 2320 and the exterior surface of the front portion 2312 of container wall 2310 form a substantially integral surface. For example, the lens insert may have a thickness of about ⅛ inch with the other two layers being about 1 mil to about 20 mils or more combined. In other embodiments, however, the insert 2320 may extend outward or inward from the adjacent portions of the front container wall 2312. The label 2330 may be configured similar to the labels in FIGS. 16-22. The label 2330 includes an exterior surface 2332 distal to the container wall 2310 and an interior surface 2334 adjacent and abutting the container wall 2310. On the inner or interior surface 2334, a data area and/or printed image 2336 is provided at a location on the label 2330 such that when the label 2330 is applied to the container wall 2310 the printed image 2336 is at a portion of the container 2314 that is substantially opposite the position of a central portion of the lens array 2320 (or indentation 2313 which typically coincide) on the front portion or wall 2312 of the container 2300.

When assembled, the lens structure or system is made up of the lens insert or array 2320, the adhesive 2322 (if included), the thickness of the wall 2310 at the indentation 2313, any contents of the container 2310, and the thickness of the rear or second wall portion 2314 adjacent the printed image, and hence, the lenticules on the insert 2320 are configured to take into account the various thicknesses and materials of these elements and possible distortions (such as due to curvature of the container 2300) in achieving a focal point at or near the printed image 2336.

Figure 24:
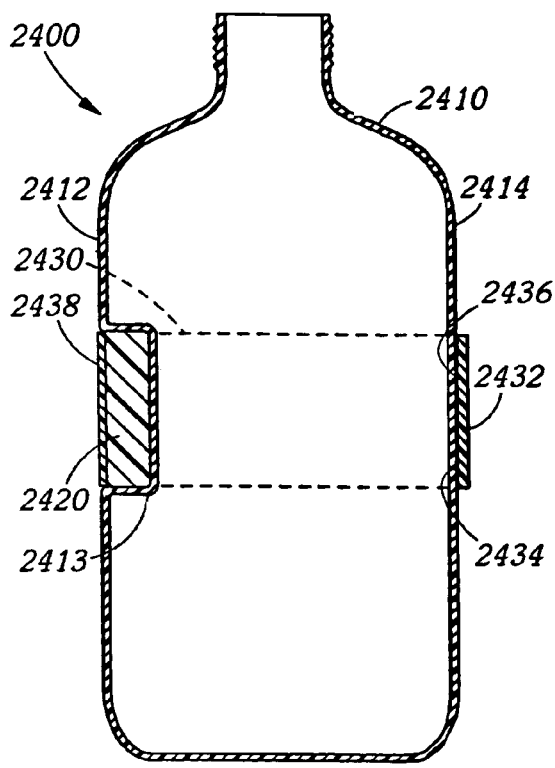
FIG. 24 is a sectional view similar to FIG. 23 illustrating another embodiment in which the lenticular lens element is positioned prior to applying the wrap around label such that the lenticules are covered by the clear label.

FIG. 24 shows a container 2400 similar to that of container 2300, but in this case, the container 2400 positions a lens insert between the label and the container wall. As shown, the container 2400 includes a container wall 2410 having a front wall or portion 2412 with an indentation or recessed surface 2413 and a rear wall or portion 2414 distal to the front portion (or opposite the front portion 2412 on the container wall 2410). A lenticular lens array or insert 2420 is included in the container 2400 and snapped into or positioned within the indentation 2413, where it is preferably interference fit for mechanical support and retention (although an adhesive may be utilized (not shown)) and where the mechanical retention is furthered by the application of the label 2430 which wraps around the container wall 2410 so as to at least partially cover the lens insert 2420. As with the embodiments shown in FIG. 1 and the like, the insert 2420 essentially becomes an integral portion of the container wall 2410 and the clear label 2430 covers and abuts the lenticules on the insert 2420 without significantly interfering with or degrading the visual effects achieved by the created lens structure.

As with container 2300, the label 2430 comprises an exterior side 2432 distal to the container wall 2410 and an interior side or surface 2434 that abuts and is proximal to the container wall 2410. For example, the interior surface 2434 contacts and retains the insert 2420 within the indentation 2420, thus reducing the need for an adhesive to keep the insert 2430 within the indentation 2413. The label 2430 further includes a printed image (or data area) 2436 on the interior surface 2434 that is printed on the label 2430 at a location such when the label is applied to the container wall 2410 the printed image 2436 is opposite a central portion of the positioned insert 2420 (or indentation 2413). In manufacturing the container 2400, the lenticules of the lens insert 2420 are designed based on any distortion caused by the portion 2438 of the label 2430 contacting and covering the insert 2420, the thickness and material of the insert 2420, the use, if any, of an adhesive, the thickness, material, and distortion of the container wall 2410 at the indentation 2413 and the rear portion or wall 2414 adjacent or proximal the printed image 2436 and any effects of an empty container or a container filled with a liquid or other content.

In another embodiment not shown, a container is provided similar to that of container 2400 except the label 2430 is omitted. Instead, a printed image is printed or otherwise provided at the rear wall of the container opposite the lens insert, such as by printing on the inside or outside of the container wall or with a decal affixed to the exterior surface of the container wall. In this embodiment, a tighter fit would be required since the label would not be used to retain the lens insert or alternatively, the lens insert would be held within the indentation by an adhesive.

Figure 25:
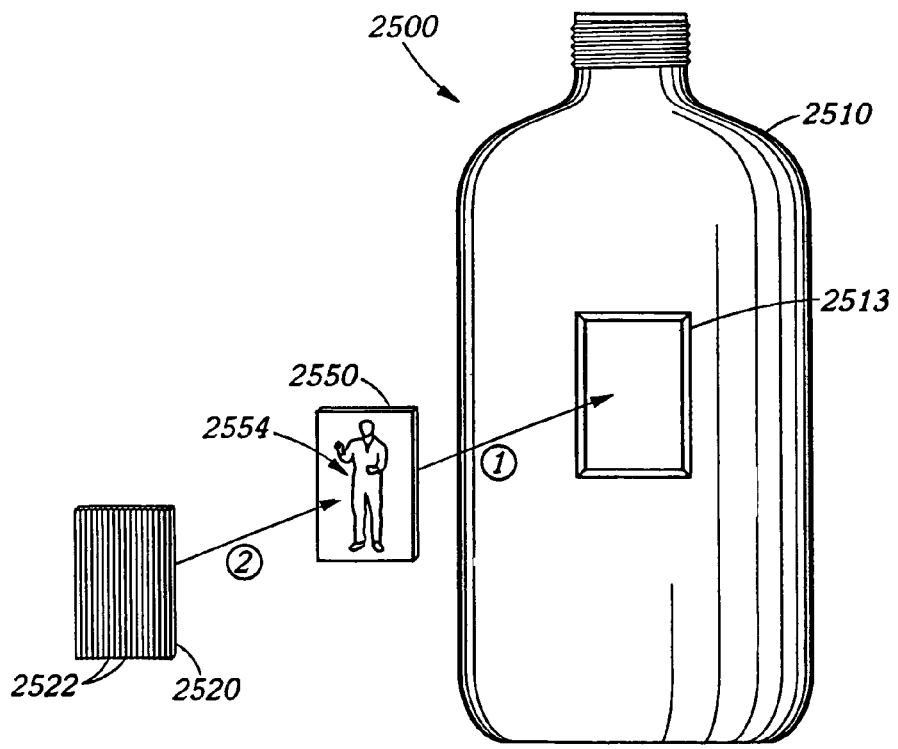
FIG. 25 illustrates another embodiment of a container in which a label is inserted into an indentation or recessed portion of the container wall with a lenticular lens element positioned over the label.

FIG. 25 shows a front view of another embodiment of a container 2500 similar to that of containers 2300 and 2400. In this embodiment, the container has a wall 2510 with an indentation 2513. A label or decal 2550 is created with a printed image 2554, and the label 2550 is affixed within the indentation 2513 to abut the wall 2510 (or is affixed to the flat side of the lens insert 2520 or is left "loose" but held in place by the insert 2520). The container 2500 includes a lenticular lens insert or array 2520 that includes a first or outer surface with a plurality of lenticules 2522. The insert 2520 is placed in the indentation 2513 of the wall 2510 to cover the label 2550, and the insert is held in place mechanically such as with a press fit or by other physical means and/or is affixed with adhesive on the flat side abutting the label 2550 or with adhesive on the sides abutting the sides of the indentation 2513 (i.e., side wall extending outward from the interior portion of the container 2500). In this embodiment 2500, the lens system includes only the insert and the lenticules 2522 are configured to focus on the label 2550 or image 2554 taking into account the material of the insert 2520, any curvature of the insert 2520, and the thickness of the insert 2520 (i.e., typically about that of the depth of the indentation 2513).

Figure 26:
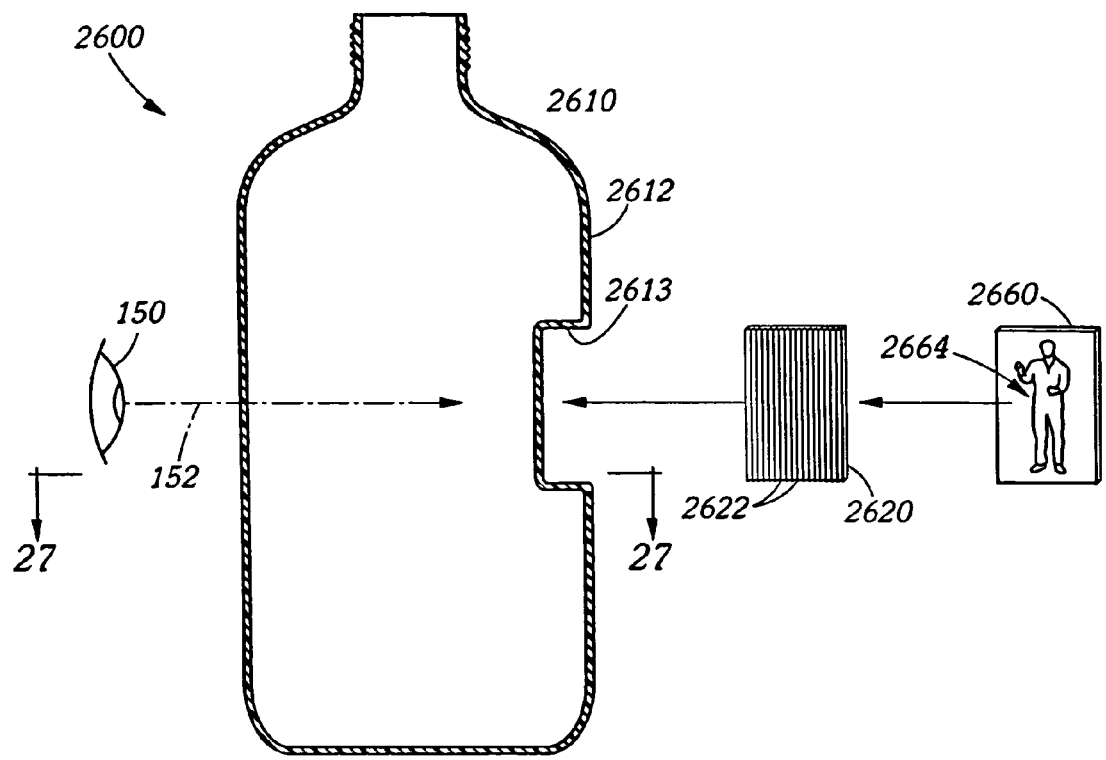
FIG. 26 illustrates a sectional view of yet another embodiment of a container according to the invention which includes a recessed portion in which a lenticular lens element is inserted with a lenticular lens array abutting the container exterior surface and in which a label with a printed image is positioned over the lenticular lens element.
Figure 27:
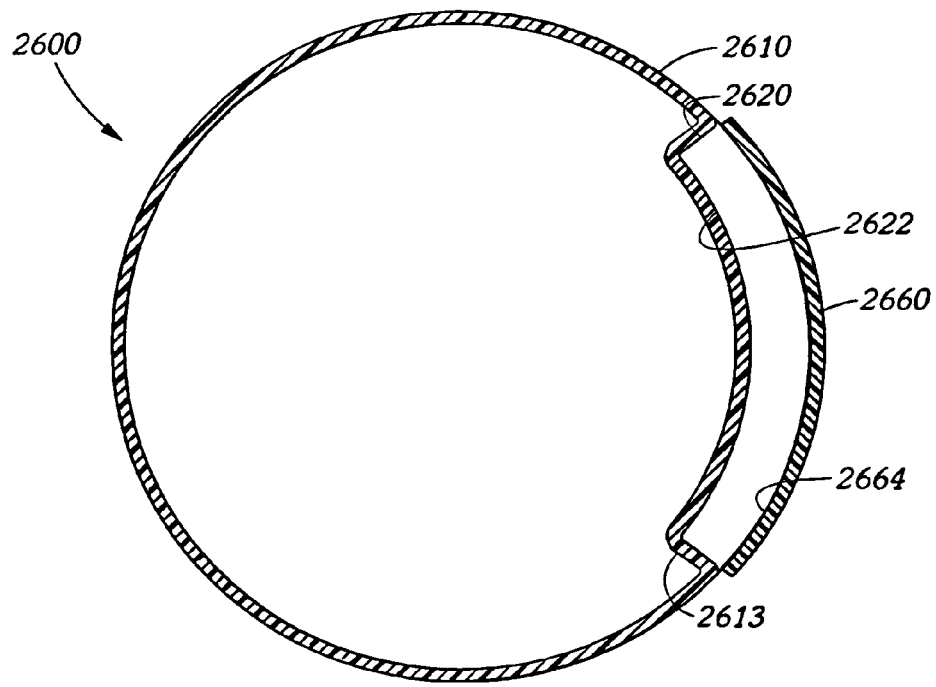
FIG. 27 is a sectional view of the container of FIG. 26.

FIGS. 26 and 27 illustrate yet another embodiment of a container 2600 according to the invention. With container 2600, a container wall 2620 is provided with a rear portion 2612 that is typically held distal to a viewer 150 that views images created by the lens system or structure of the container 2600 by viewing along a sight line 152 through the container wall 2610 to the rear portion 2612. The wall 2610 includes an indentation 2613 for receiving a lenticular lens insert 2620 over which a label 2660 is placed to put a printed image 2664 in abutting contact with a flat or web portion of insert 2620. As shown in FIG. 27, the lens insert 2620 comprises a plurality of lenticules 2622 that when positioned within the container 2600 abut or are adjacent to the container wall 2610 within the indentation 2613, i.e., the lenticules are proximal to the container wall 2610 in this embodiment.

The decal or label 2660 is positioned over the lenticular insert 2620 to position the printed image adjacent the insert 2620 (although in some embodiments the image 2664 is provided on the side of the label 2660 distal to the insert 2620. The label is typically glued to the insert 2620 but in some embodiments, the label is affixed with an adhesive that borders the image 2664 and the label 2660 is larger in size than the insert 2620 such that the adhesive (not shown) bonds with the container wall 2610 and only partially or not at all with the insert 2620. In this fashion, the label 2660 can be used to physically retain the insert 2620 within the insert 2613, and again the insert 2620 is selected to have a thickness approximately equal to the depth of the indentation 2613 such that its exterior surface (i.e., the surface distal to the container wall 2610) is flush with the rear wall or portion 2612. In this embodiment, the lens system includes the container walls 2610 (front and back) as well as the lens insert 2620 and any contents of the container 2600. Hence, the lenticules 2622 are preferably selected or formed to take into account distortions caused by the front wall of the container and its thicknesses and materials as well as the thickness and material of the indentation 2613 and liquid contents of the container 2600 to focus the lens system on the printed image 2664 on the label 2660. Further, any curvature of the insert 2620 itself should be taken into account when selecting and fabricating the lenticules 2622 on the insert 2620. While shown as having a size proximate to the insert 2620, the label 2660 may also be larger and even take the form of a wrap around label such as label 1630.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

For example, the lenticular lens or optical systems of the invention may be incorporated in nearly any container having one or more clear or translucent walls such as containers having substantially rectangular cross-sections or frustoconical shapes and is not limited to bottles, which were provided as exemplary and useful embodiments in the figures. Further, the design process for selecting the lenticule frequency based on the container wall thickness and other factors is not a required feature of the invention and the lenticular lens systems of the invention may be engineered and design parameters selected using other techniques including experience and knowledge combined with empirical data including trial and error methods involving fabricating sets of prototypes to determine a desired mix of the lenticular lens array design characteristics for a particular container, container wall material, and even for particular liquids.

Further, the lenticular lens inserts and arrays were typically shown to be rectangular or square. It will be readily appreciated that such inserts and arrays (and the indentations that receive such inserts) may take many shapes and forms, such as circular, triangular, hexagonal, and the like, including irregular shapes.

I claim:

1. A container adapted for producing a graphical image observable by a viewer external to the container, comprising:
    a lenticular lens insert comprising a plurality of lenticules for focusing a line of sight of the viewer on an area;
    a front container wall comprising an indentation, wherein the lenticular lens insert is positioned within the indentation with the lenticules distal to the front container wall;
    a rear container wall; and
    a printed image element positioned at the focusing area of the lenticules proximal to a side of the lenticular lens insert opposite the lenticules, the focusing area being within the indentation;

wherein the front container wall has an arcuate cross section and wherein the lens insert has an arcuate cross section and is formed of a rigid glass or plastic such that the arcuate cross section of the lens insert is configured prior to insertion in the indentation for focusing on the area.

2. The container of claim 1, wherein a radius defining the arcuate cross section of the front container wall is substantially equal to a radius defining the arcuate cross section of the lens insert.

3. The container of claim 1, wherein the printed image element is printed directly on the front container wall within the indentation.

4. The container of claim 1, further comprising a decal positioned within the indentation between the front container wall and the lenticular lens insert, the printed image element is printed onto a side of the decal that abuts the lenticular lens insert.

* * * * *